(12) United States Patent
Kittichokechai et al.

(10) Patent No.: US 12,526,807 B2
(45) Date of Patent: Jan. 13, 2026

(54) SYSTEMS AND METHODS RELATED TO SUB-SLOT PHYSICAL UPLINK CONTROL CHANNEL (PUCCH) REPETITIONS

(71) Applicant: Telefonaktiebolaget LM Ericsson (publ), Stockholm (SE)

(72) Inventors: Kittipong Kittichokechai, Järfälla (SE); Mattias Andersson, Sundbyberg (SE); Yufei Blankenship, Kildeer, IL (US); Ali Behravan, Stockholm (SE); Sorour Falahati, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 305 days.

(21) Appl. No.: 17/909,499

(22) PCT Filed: Mar. 5, 2021

(86) PCT No.: PCT/IB2021/051872
§ 371 (c)(1),
(2) Date: Sep. 6, 2022

(87) PCT Pub. No.: WO2021/176418
PCT Pub. Date: Sep. 10, 2021

(65) Prior Publication Data
US 2023/0171778 A1    Jun. 1, 2023

Related U.S. Application Data

(60) Provisional application No. 62/986,348, filed on Mar. 6, 2020.

(51) Int. Cl.
*H04W 72/21* (2023.01)
*H04L 1/1607* (2023.01)
(Continued)

(52) U.S. Cl.
CPC ........... *H04W 72/21* (2023.01); *H04L 1/1671* (2013.01); *H04L 1/1858* (2013.01); *H04W 72/0446* (2013.01)

(58) Field of Classification Search
CPC .. H04W 72/21; H04W 72/0446; H04L 1/1671
(Continued)

(56) References Cited

U.S. PATENT DOCUMENTS 10,396,940 B1    8/2019  Nammi et al.
11,424,972 B2 *  8/2022  Matsumura ........... H04L 5/0051
(Continued)

FOREIGN PATENT DOCUMENTS

CN    110583081 A      12/2019
WO    2019062563 A1    4/2019
(Continued)

OTHER PUBLICATIONS

Khosnevisan et al. (U.S. Appl. No. 62/878,698), All pages (Year: 2019).*
(Continued)

*Primary Examiner* — Anthony Mejia
(74) *Attorney, Agent, or Firm* — Withrow & Terranova, PLLC

(57) ABSTRACT

Systems and methods related to sub-slot Physical Uplink Control Channel (PUCCH) repetitions are disclosed herein. In one embodiment, a method performed by a wireless communication device for sub-slot PUCCH repetitions comprises receiving one or more sub-slot PUCCH repetition configurations from a base station and transmitting two or more sub-slot PUCCH repetitions in accordance with one of the one or more sub-slot PUCCH repetition configurations. In this manner, sub-slot PUCCH transmissions can be made to be more reliable or have better coverage.

35 Claims, 23 Drawing Sheets

(51) Int. Cl.
*H04L 1/1829* (2023.01)
*H04W 72/0446* (2023.01)

(58) Field of Classification Search
USPC .......................................................... 370/329
See application file for complete search history.

(56) References Cited

U.S. PATENT DOCUMENTS

| | | | |
|---|---|---|---|
| 12,127,169 B2* | 10/2024 | Wang | H04W 72/0446 |
| 2010/0195629 A1 | 8/2010 | Chen et al. | |
| 2018/0278380 A1* | 9/2018 | Kim | H04L 1/1671 |
| 2018/0279296 A1* | 9/2018 | Hosseini | H04L 5/0053 |
| 2020/0213981 A1 | 7/2020 | Park et al. | |
| 2020/0221448 A1* | 7/2020 | Park | H04W 80/08 |
| 2020/0221474 A1* | 7/2020 | Lee | H04L 1/1896 |
| 2020/0351891 A1* | 11/2020 | Hosseini | H04W 72/53 |
| 2020/0374089 A1 | 11/2020 | Yang et al. | |
| 2021/0029708 A1* | 1/2021 | Khoshnevisan | H04W 72/23 |
| 2021/0083913 A1 | 3/2021 | Matsumura et al. | |
| 2022/0330299 A1 | 10/2022 | Jang et al. | |
| 2023/0128932 A1 | 4/2023 | Kim et al. | |

FOREIGN PATENT DOCUMENTS

| | | |
|---|---|---|
| WO | 2019099565 A1 | 5/2019 |
| WO | 2019159299 A1 | 8/2019 |
| WO | 2019160846 A1 | 8/2019 |
| WO | 2020029260 A1 | 2/2020 |
| WO | 2020032637 A1 | 2/2020 |
| WO | 2020146247 A2 | 7/2020 |
| WO | 2021176418 A1 | 9/2021 |
| WO | 2022024047 A1 | 2/2022 |

OTHER PUBLICATIONS

Author Unknown, "Technical Specification Group Radio Access Network; NR; Physical layer procedures for control (Release 16)," Technical Specification 38.213, Version 16.0.0, Dec. 2019, 3GPP Organizational Partners, 146 pages.

International Search Report and Written Opinion for International Patent Application No. PCT/IB2021/051872, mailed Jun. 8, 2021, 17 pages.

International Preliminary Report on Patentability for International Patent Application No. PCT/IB2021/051872, mailed Feb. 28, 2022, 26 pages.

Examination Report for European Patent Application No. 21711373.7, mailed Nov. 27, 2023, 9 pages.

Panasonic, "R1-1908799: Discussion on UCI enhancement for URLLC," 3GPP TSG RAN WG1 #98, Aug. 26-30, 2019, Prague, Czech Republic, 8 pages.

First Office Action for Chinese Patent Application No. 202180033215.1, mailed Mar. 3, 2025, 33 pages.

Author Unknown, "Technical Specification Group Radio Access Network; NR; Physical layer procedures for control (Release 16)," Technical Specification 38.213, Version 16.2.0, Jun. 2020, 3GPP Organizational Partners, 176 pages.

Second Office Action for Chinese Patent Application No. 202180033215.1, mailed Aug. 12, 2025, 35 pages.

OPPO, "R1-2004674: Summary#1 on UCI enhancements for R16 URLLC," 3GPP TSG RAN WG1 #101, May 25-Jun. 5, 2020, Electronic Meeting, 65 pages.

Rejection Decision for Chinese Patent Application No. 202180033215.1, mailed Oct. 30, 2025, 35 pages.

* cited by examiner

```
PUCCH-Resource ::=       SEQUENCE {
    pucch-ResourceId         PUCCH-ResourceId,
    startingPRB              PRB-Id,
    intraSlotFrequencyHopping ENUMERATED { enabled }       OPTIONAL,    -- Need R
    secondHopPRB             PRB-Id                                     OPTIONAL,    -- Need R
    format                   CHOICE {
        format0                  PUCCH-format0,
        format1                  PUCCH-format1,
        format2                  PUCCH-format2,
        format3                  PUCCH-format3,
        format4                  PUCCH-format4
    },
    repetitionNum            ENUMERATED {n2_slots,n4_slots,n8_slots,n2_sub-slots,n4_sub-slots,n8_sub-slots,...} OPTIONAL,
    -- Need S
}
```

FIG. 7

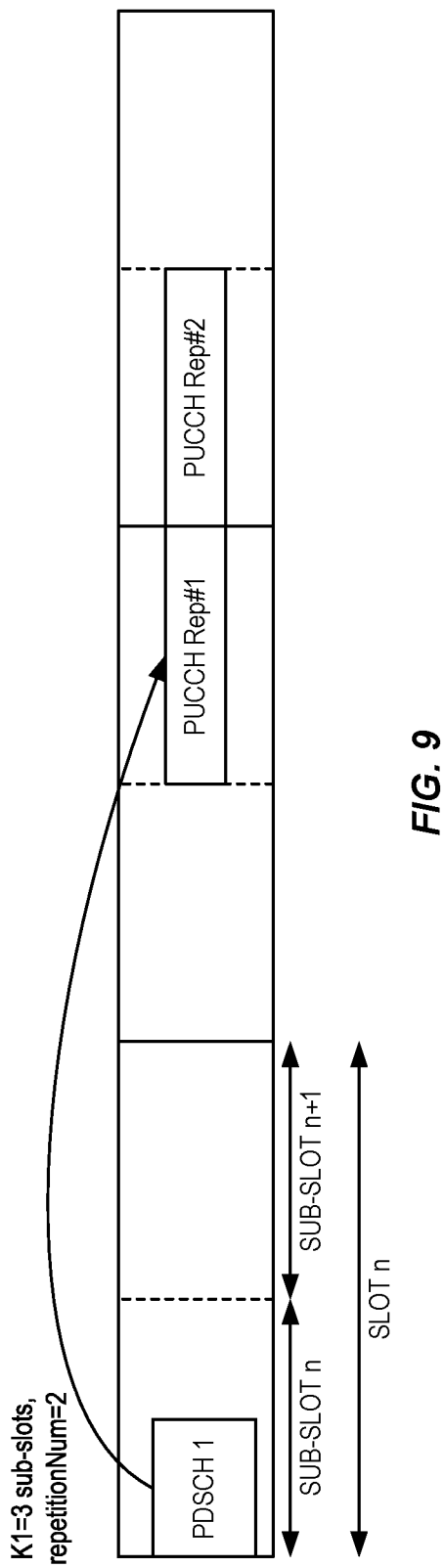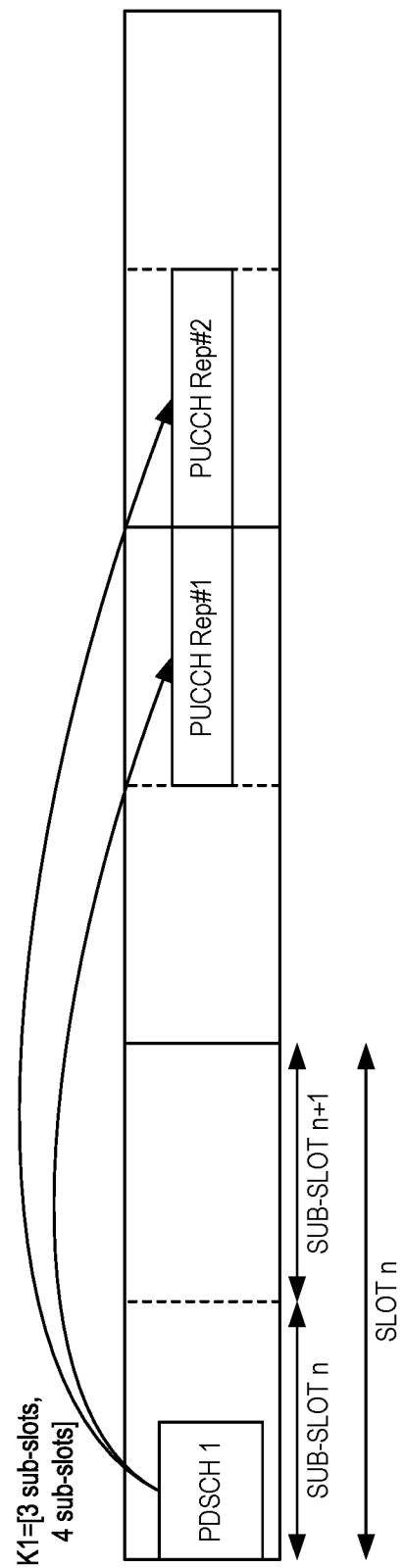

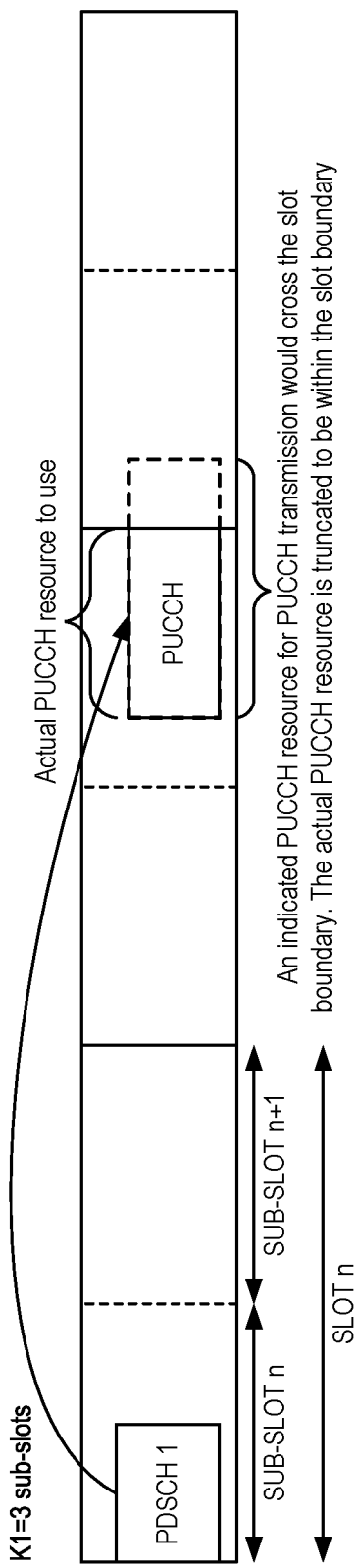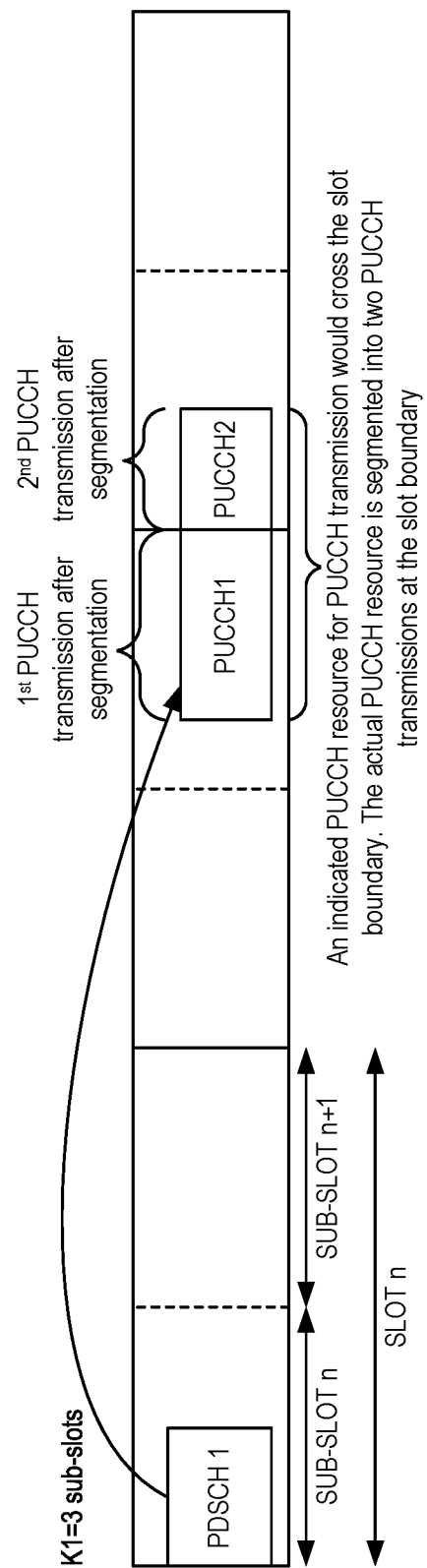

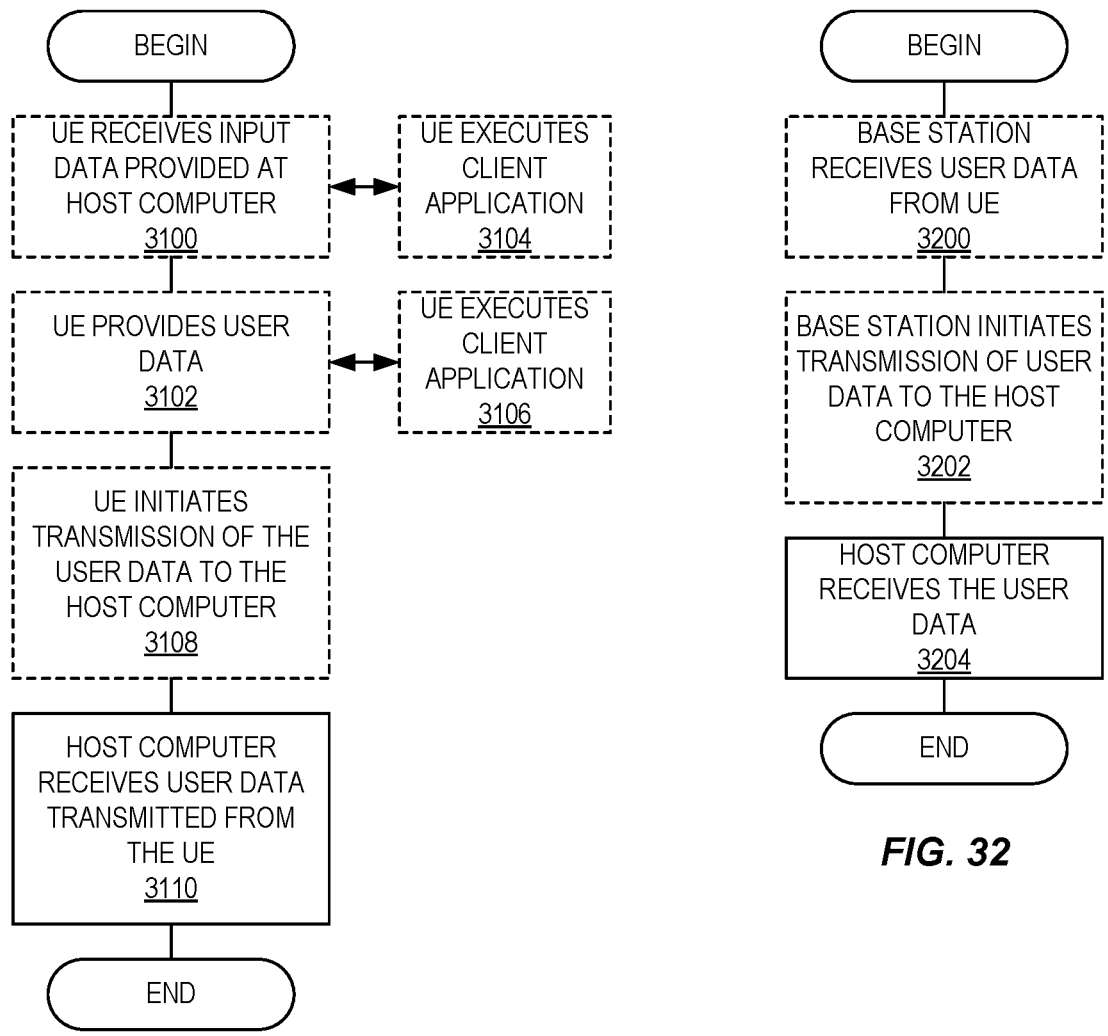

SYSTEMS AND METHODS RELATED TO SUB-SLOT PHYSICAL UPLINK CONTROL CHANNEL (PUCCH) REPETITIONS

RELATED APPLICATIONS

This application is a 35 U.S.C. § 371 national phase filing of International Application No. PCT/IB2021/051872, filed Mar. 5, 2021, which claims the benefit of provisional patent application Ser. No. 62/986,348, filed Mar. 6, 2020, the disclosures of which are hereby incorporated herein by reference in their entireties.

TECHNICAL FIELD

The present disclosure relates to Physical Uplink Control Channel (PUCCH) transmission with repetitions in a cellular communications system.

BACKGROUND

New Radio (NR) standard in Third Generation Partnership Project (3GPP) is designed to provide service for multiple use cases such as enhanced Mobile Broadband (eMBB), Ultra-Reliable Low-Latency Communication (URLLC), and Machine Type Communication (MTC). Each of these services has different technical requirements. For example, the general requirements for eMBB are high data rate with moderate latency and moderate coverage, while URLLC service requires a low latency and high reliability transmission but perhaps for moderate data rates.

One of the solutions for low latency data transmission is shorter transmission time intervals. In NR, in addition to transmission in a slot, a mini-slot transmission is also allowed to reduce latency. A mini-slot is a concept that is used in scheduling. In downlink (DL), a min-slot can consist of 2, 4, or 7 Orthogonal Frequency Division Multiplexing (OFDM) symbols, while in uplink (UL) a mini-slot can be any number of 1 to 14 OFDM symbols. It should be noted that the concepts of slot and mini-slot are not specific to a specific service, meaning that a mini-slot may be used for either eMBB, URLLC, or other services.

FIG. 1 illustrates an exemplary radio resource in NR.

Downlink Control Information

In the 3GPP NR standard, Downlink Control Information (DCI), which is transmitted in Physical Downlink Control Channel (PDCCH), is used to indicate the DL data related information, UL related information, power control information, slot format indication, etc. There are different formats of DCI associated with each of these control signals, and the User Equipment (UE) identifies them based on different Radio Network Temporary Identifiers (RNTIs).

A UE is configured by higher layer signaling to monitor for DCIs in different resources with different periodicities, etc. DCI formats 1_0, 1_1, and 1_2 are used for scheduling DL data, which is sent in Physical Downlink Shard Channel (PDSCH), and include time and frequency resources for DL transmission, as well as modulation and coding information, Hybrid Automatic Repeat Request (HARQ) information, etc.

HARQ Feedback

The procedure for receiving a DL transmission is that the UE first monitors and decodes a PDCCH in slot n which points to a DL data transmission scheduled in slot $n+K_0$ where $K_0$ is larger than or equal to 0. The UE then decodes the data in the corresponding PDSCH. Finally, based on the outcome of the decoding, the UE sends an acknowledgement (ACK) or a negative acknowledgement (NACK) to the NR base station (gNB) at time slot $n+K_0+K_1$. Note that, in case of slot aggregation, $n+K_0$ would be replaced by the slot where PDSCH ends such that the ACK/NACK is sent in the time slot that occurs $K_1$ slots after the slot where the PDSCH ends. Both $K_0$ and $K_1$ are indicated in the downlink DCI. The resources for sending the ACK/NACK are indicated by the PUCCH Resource Indicator (PRI) field in the DCI, where the PRI field points to one of the PUCCH resources that are configured by higher layers.

Depending on DL/UL slot configurations, or whether carrier aggregation or per Code-Block Group (CBG) transmission is used in the DL, the feedback for several PDSCHs may need to be multiplexed in one feedback. This is done by constructing HARQ-ACK codebooks. In NR, the UE can be configured to multiplex the ACK/NACK (A/N) bits using a semi-static codebook or a dynamic codebook.

A type 1, or semi-static, codebook consists of a bit sequence where each element contains the A/N bit from a possible allocation in a certain slot, carrier, or Transport Block (TB). When the UE is configured with CBG and/or Time-Domain Resource Allocation (TDRA) table with multiple entries, multiple bits are generated per slot and TB. It is important to note that the codebook is derived regardless of the actual PDSCH scheduling. The size and format of the semi-static codebook is preconfigured based on the mentioned parameters. The drawback of semi-static HARQ ACK codebook is that the size is fixed and, regardless of whether there is a transmission or not, a bit is reserved in the feedback matrix.

For the case when a UE has a TDRA table with multiple time-domain resource allocation entries configured, the table is pruned (i.e., entries are removed based on a specified algorithm) to derive a TDRA table that only contains non-overlapping time-domain allocations. One bit is then reserved in the HARQ codebook for each non-overlapping entry, assuming the UE is capable of supporting reception of multiple PDSCH in a slot.

To avoid reserving unnecessary bits in a semi-static HARQ codebook, in NR, a UE can be configured to use a type 2, or dynamic, HARQ codebook, where an A/N bit is present only if there is a corresponding transmission scheduled. To avoid any confusion between the gNB and the UE on the number of PDSCHs for which the UE has to send a feedback, a counter Downlink Assignment Indicator (DAI) field exists in the DL assignment, which denotes an accumulative number of {serving cell, PDCCH occasion} pairs in which a PDSCH is scheduled to a UE up to the current PDCCH. In addition to that, there is another field called total DAI that, when present, shows the total number of {serving cell, PDCCH occasion} up to (and including) all PDCCHs of the current PDCCH monitoring occasion. The timing for sending HARQ feedback is determined based on both PDSCH transmission slot with reference to PDCCH slot ($K_0$) and the PUCCH slot that contains HARQ feedback ($K_1$).

FIG. 2 illustrates the timeline in a simple scenario with two PDSCHs and one feedback. In this example, there are four PUCCH resources configured in total, and the PRI indicates PUCCH 2 to be used for HARQ feedback. The following explains how PUCCH 2 is selected from the four configured PUCCH resources based on the procedure in 3GPP NR Release 15.

In NR Release 15, a UE can be configured with a maximum of four PUCCH resource sets for transmission of HARQ-ACK information. Each PUCCH resource set is associated with a range of Uplink Control Information (UCI) payload bits including HARQ-ACK bits. The first set is always associated to one or two HARQ-ACK bits and hence includes only PUCCH format 0 or 1 or both. The range of payload values (minimum of maximum values) for other sets, if configured, is provided by configuration except the maximum value for the last set where a default value is used, and the minimum value of the second set being 3. The first set can include maximum 32 PUCCH resources of format 0 or 1. Other sets can include maximum 8 bits of format 2 or 3 or 4.

As described previously, the UE determines a slot for transmission of HARQ-ACK bits in a PUCCH corresponding to PDSCHs scheduled or activated by DCI via the K1 value provided by configuration or a field in the corresponding DCI. The UE forms a codebook from the HARQ-ACK bits with associated PUCCH in a same slot via corresponding K1 values.

The UE determines a PUCCH resource set that the size of the codebook is within the corresponding range of payload values associated to that set.

The UE determines a PUCCH resource in that set, if the set is configured with maximum eight PUCCH resources, by a field in the last DCI associated to the corresponding PDSCHs. If the set is the first set and is configured with more than eight resources, a PUCCH resource in that set is determined by a field in the last DCI associated to the corresponding PDSCHs and implicit rules based on the CCE.

A PUCCH resource for HARQ-ACK transmission can overlap in time with other PUCCH resources for Channel State Information (CSI) and/or Scheduling Request (SR) transmissions as well as PUSCH transmissions in a slot. In case of overlapping PUCCH and/or PUSCH resources, first the UE resolves overlapping between PUCCH resources, if any, by determining a PUCCH resource carrying the total UCI (including HARQ-ACK bits) such that the UCI multiplexing timeline requirements are met. There might be partial or complete dropping of CSI bits, if any, to multiplex the UCI in the determined PUCCH resource. Then, the UE resolves overlapping between PUCCH and PUSCH resources, if any, by multiplexing the UCI on the PUSCH resource if the timeline requirements for UCI multiplexing are met.

PUCCH Repetition in Release 15

In NR Release 15, PUCCH repetition over multiple slots is supported. This is useful, e.g., for increased coverage. Only long PUCCH formats, namely formats 1, 3, and 4 are supported. The number of repetitions (2, 4, or 8 slots) is semi-statically configured by a parameter nrofSlots in PUCCH-FormatConfig in the PUCCH-config Information Element (IE). The same resource allocation (e.g., same number of consecutive symbols, same starting symbol) is used for each repetition over multi slots. See Section 9.2.6 in 3GPP Technical Specification (TS) 38.213 for the complete description.

Sub-Slot HARQ-ACK

In NR Release 16, an enhancement on HARQ-ACK feedback is made to support more than one PUCCH carrying HARQ-ACK in a slot for supporting different services and for possible fast HARQ-ACK feedback for URLLC. This leads to an introduction of new HARQ-ACK timing in a unit of sub-slot, i.e., K1 indication in a unit of sub-slot. Sub-slot configurations for PUCCH carrying HARQ-ACK can be configured from the two options, namely "2-symbol*7" and "7-symbol*2" for the sub-slot length of 2 symbols and 7 symbols, respectively. The indication of K1 is the same as that of Release 15, that is, K1 is indicated in the DCI scheduling PDSCH. To determine the HARQ-ACK timing, there exists an association of PDSCH to sub-slot configuration in that if the scheduled PDSCH ends in sub-slot n, the corresponding HARQ-ACK is reported in sub-slot n+K1. In a sense, sub-slot based HARQ-ACK timing works similarly to that of Release 15 slot-based procedure by replacing the unit of K1 from slot to sub-slot.

There exist some limitations on PUCCH resources for sub-slot HARQ-ACK. That is, only one PUCCH resource configuration is used for all sub-slots in a slot. Moreover, any sub-slot PUCCH resource is not across sub-slot boundaries.

FIG. 3 shows an example where each PDSCH is associated with a certain sub-slot for HARQ feedback through the use of a K1 value in units of sub-slots. In particular, FIG. 3 shows an example of K1 indication based on sub-slots with "7-symbol*2" configuration for 2 PUCCHs in two sub-slots that carry the HARQ feedback of PDSCH transmissions.

Priority Indication of HARQ-ACK

In Release 16, two-level physical layer (PHY) priority can be indicated in the DCI for HARQ-ACK corresponding to a dynamically scheduled PDSCH or Radio Resource Control (RRC)-configured for HARQ-ACK corresponding to DL Semi-Persistent Scheduling (SPS). This priority indication can be used to determine the priority of the HARQ-ACK codebook for collision handling.

NR Release 16 supports up to two HARQ-ACK codebooks with different priorities to be simultaneously constructed. This includes one being slot-based and one being sub-slot-based, both being slot-based, or both being sub-slot-based.

SUMMARY

Systems and methods related to sub-slot Physical Uplink Control Channel (PUCCH) repetitions are disclosed herein. In one embodiment, a method performed by a wireless communication device for sub-slot PUCCH repetitions comprises receiving one or more sub-slot PUCCH repetition configurations from a base station and transmitting two or more sub-slot PUCCH repetitions in accordance with one of the one or more sub-slot PUCCH repetition configurations. In this manner, sub-slot PUCCH transmissions can be made to be more reliable or have better coverage.

In one embodiment, receiving the one or more sub-slot PUCCH repetition configurations comprises receiving one or more semi-static sub-slot PUCCH repetition configurations. In one embodiment, the one or more semi-static sub-slot PUCCH repetition configurations are associated to one or more PUCCH formats, respectively. In one embodiment, the method further comprises receiving downlink control information that schedules a Physical Downlink Shared Channel (PDSCH) transmission to the wireless communication device and includes an indication of a particular PUCCH format for the two or more sub-slot PUCCH repetitions, the particular PUCCH format being one of the one or more PUCCH formats, wherein transmitting the two or more sub-slot PUCCH repetitions comprises transmitting the two or more sub-slot PUCCH repetitions in accordance with a respective one of the one or more semi-static sub-slot PUCCH repetition configurations that is associated to the particular PUCCH format.

In one embodiment, the one or more semi-static sub-slot PUCCH repetition configurations are associated to one or more PUCCH resources, respectively. In one embodiment, the method further comprises receiving downlink control information that schedules a PDSCH transmission to the wireless communication device and includes an indication of a particular PUCCH resource for the two or more sub-slot PUCCH repetitions, the particular PUCCH resource being one of the one or more PUCCH resources, wherein transmitting the two or more sub-slot PUCCH repetitions comprises transmitting the two or more sub-slot PUCCH repetitions in accordance with a respective one of the one or more semi-static sub-slot PUCCH repetition configurations that is associated to the particular PUCCH resource.

In one embodiment, receiving the one or more sub-slot PUCCH repetition configurations comprises receiving a dynamic sub-slot PUCCH repetition configuration for a PUCCH transmission comprising the two or more sub-slot PUCCH repetitions. In one embodiment, receiving the dynamic sub-slot PUCCH repetition configuration comprises receiving downlink control information that schedules a PDSCH transmission to the wireless communication device and includes the dynamic sub-slot PUCCH repetition configuration or an indication of the dynamic sub-slot PUCCH repetition configuration. In one embodiment, transmitting the two or more sub-slot PUCCH repetitions comprises transmitting the two or more sub-slot PUCCH repetitions in accordance with the dynamic sub-slot PUCCH repetition configuration. In one embodiment, the dynamic sub-slot PUCCH repetition configuration comprises a field in the downlink control information that indicates a number of sub-slot PUCCH repetitions. In one embodiment, the method further comprises receiving a configuration of a set of possible sub-slot PUCCH repetition configurations, wherein the dynamic sub-slot PUCCH repetition configuration comprises a value that selects one of the set of possible sub-slot PUCCH repetition configurations as the dynamic sub-slot PUCCH repetition configuration.

In one embodiment, receiving the dynamic sub-slot PUCCH repetition configuration comprises receiving downlink control information that schedules a PDSCH transmission to the wireless communication device and includes a PUCCH resource indicator (PRI) that indicates a particular PUCCH resource, wherein the dynamic sub-slot PUCCH repetition configuration comprises a pre-configured number of repetitions for the particular PUCCH resource.

In one embodiment, the dynamic sub-slot PUCCH repetition configuration comprises a number of repetitions defined in units of a slot. In another embodiment, the dynamic sub-slot PUCCH repetition configuration comprises a number of repetitions defined in units of a sub-slot.

In one embodiment, the downlink control information further comprises an indication for Hybrid Automatic Repeat Request (HARQ) Acknowledgement (ACK) timing, and the indication for HARQ ACK timing is applied to a first sub-slot PUCCH repetition from among the two or more sub-slot PUCCH repetitions. In one embodiment, subsequent sub-slot PUCCH repetitions from among the two or more sub-slot PUCCH repetitions occupy subsequent, consecutive available sub-slots.

In one embodiment, the one or more sub-slot PUCCH repetition configurations comprises two or more HARQ ACK timing values for the two or more sub-slot PUCCH repetitions, respectively.

In one embodiment, each sub-slot PUCCH repetition from among the two or more sub-slot PUCCH repetitions use a same resource allocation in the time domain across two or more consecutive, available sub-slots.

In one embodiment, each sub-slot PUCCH repetition from among the two or more sub-slot PUCCH repetitions is contained within a respective sub-slot. In another embodiment, at least one sub-slot PUCCH repetition from among the two or more sub-slot PUCCH repetitions spans across a sub-slot boundary. In another embodiment, at least one sub-slot PUCCH repetition from among the two or more sub-slot PUCCH repetitions spans across a slot boundary. In another embodiment, a PUCCH resource for one of the two or more sub-slot PUCCH repetitions crosses a sub-slot boundary, and the one of the two or more sub-slot PUCCH repetitions is truncated to be within the sub-slot boundary. In another embodiment, a PUCCH resource for one of the two or more sub-slot PUCCH repetitions crosses a slot boundary, and the one of the two or more sub-slot PUCCH repetitions is truncated to be within the slot boundary.

In one embodiment, the two or more sub-slot PUCCH repetitions are performed in a back-to-back manner without any symbols gaps between the two or more sub-slot PUCCH repetitions.

In one embodiment, at least one of the two or more sub-slot PUCCH repetitions is extended to reach a sub-slot boundary.

In one embodiment, transmitting the two or more sub-slot PUCCH repetitions comprises transmitting the two or more sub-slot PUCCH repetitions using frequency hopping. In one embodiment, the frequency hopping is inter-sub-slot frequency hopping, inter-slot frequency hopping, or intra-sub-slot frequency hopping. In one embodiment, the method further comprises receiving a frequency hopping configuration that indicates whether or not to perform frequency hopping for sub-slot PUCCH repetitions, wherein transmitting the two or more sub-slot PUCCH repetitions using frequency hopping comprises transmitting the two or more sub-slot PUCCH repetitions using frequency hopping in accordance with the frequency hopping configuration. In one embodiment, the frequency hopping configuration indicates inter-slot frequency hopping is to be applied for sub-slot PUCCH repetitions. In one embodiment, the frequency hopping configuration comprises an inter-subslot frequency hopping configuration and an inter-slot frequency hopping configuration, and the wireless communication device ignores the inter-slot frequency hopping configuration responsive to the frequency hopping configuration comprising the inter-subslot frequency hopping configuration.

In one embodiment, transmitting the two or more sub-slot PUCCH repetitions comprises, for a sub-slot PUCCH repetition from among the two or more sub-slot PUCCH repetitions, determining that there is a collision for the sub-slot PUCCH repetition and, responsive to determining that there is a collision for the sub-slot PUCCH repetition, taking one or more actions to avoid the collision. In one embodiment, the one or more actions comprise refraining from transmitting the sub-slot PUCCH repetition. In one embodiment, the sub-slot PUCCH repetition is counted toward a number of sub-slot PUCCH repetitions transmitted.

In another embodiment, the sub-slot PUCCH repetition is not counted toward a number of sub-slot PUCCH repetitions transmitted.

In one embodiment, transmitting the two or more sub-slot PUCCH repetitions comprises, for a sub-slot PUCCH repetition from among the two or more sub-slot PUCCH repetitions, determining the sub-slot PUCCH repetition crosses a slot boundary and, responsive to determining that the sub-slot PUCCH repetition crosses a slot boundary, truncating the sub-slot PUCCH repetition to fit within the slot boundary.

In one embodiment, transmitting the two or more sub-slot PUCCH repetitions comprises, for a sub-slot PUCCH repetition from among the two or more sub-slot PUCCH repetitions, determining the sub-slot PUCCH repetition crosses a slot boundary and, responsive to determining that the sub-slot PUCCH repetition crosses a slot boundary, segmenting the sub-slot PUCCH repetition into a first segment that ends at or prior to the slot boundary and a second segment that start at or after the slot boundary.

In one embodiment, the one or more sub-slot PUCCH repetition configurations comprise one or more sub-slot PUCCH repetition configurations associated to one or more priority levels or one or more groups of priority levels, respectively. In addition, the method further comprises receiving information that explicitly or implicitly indicates a priority level of the two or more sub-slot PUCCH repetitions and transmitting the two or more sub-slot PUCCH repetitions comprises transmitting the two or more sub-slot PUCCH repetitions in accordance with one of the one or more sub-slot PUCCH repetition configurations that is associated to the indicated priority level of the two or more sub-slot PUCCH repetitions or associated to a group of priority levels that includes the indicated priority level of the two or more sub-slot PUCCH repetitions.

In one embodiment, the one or more sub-slot PUCCH repetition configurations each comprise information that indicates a number of sub-slot PUCCH repetitions to be transmitted.

Corresponding embodiments of a wireless communication device for sub-slot PUCCH repetitions is adapted to receive one or more sub-slot PUCCH repetition configurations from a base station and transmit two or more sub-slot PUCCH repetitions in accordance with one of the one or more sub-slot PUCCH repetition configurations.

In another embodiment, a wireless communication device for sub-slot PUCCH repetitions comprises one or more transmitters, one or more receivers, and processing circuitry associated with the one or more transmitters and the one or more receiver. The processing circuitry is configured to cause the wireless communication device to receive one or more sub-slot PUCCH repetition configurations from a base station and transmit two or more sub-slot PUCCH repetitions in accordance with one of the one or more sub-slot PUCCH repetition configurations.

In one embodiment, a method performed by a base station for sub-slot PUCCH repetitions comprises providing, to a wireless communication device, one or more sub-slot PUCCH repetition configurations and receiving, from the wireless communication device, a PUCCH transmission in accordance with one of the one or more sub-slot PUCCH repetition configurations.

In one embodiment, providing the one or more sub-slot PUCCH repetition configurations comprises providing one or more semi-static sub-slot PUCCH repetition configurations to the wireless communication device. In one embodiment, the one or more semi-static sub-slot PUCCH repetition configurations are associated to one or more PUCCH formats, respectively. In one embodiment, the one or more semi-static sub-slot PUCCH repetition configurations are associated to one or more PUCCH resources, respectively.

In one embodiment, providing the one or more sub-slot PUCCH repetition configurations comprises providing, to the wireless communication device, a dynamic sub-slot PUCCH repetition configuration for a PUCCH transmission comprising the two or more sub-slot PUCCH repetitions. In one embodiment, providing) the dynamic sub-slot PUCCH repetition configuration comprises providing, to the wireless communication device, downlink control information that schedules a PDSCH transmission to the wireless communication device and includes the dynamic sub-slot PUCCH repetition configuration or an indication of the dynamic sub-slot PUCCH repetition configuration. In one embodiment, providing the dynamic sub-slot PUCCH repetition configuration comprises providing, to the wireless communication device, downlink control information that schedules a PDSCH transmission to the wireless communication device and includes a PRI that indicates a particular PUCCH resource, wherein the dynamic sub-slot PUCCH repetition configuration comprises a pre-configured number of repetitions for the particular PUCCH resource.

In one embodiment, downlink control information that schedules a downlink transmission to the wireless commination device that is associated to the two or more sub-slot PUCCH repetitions comprises an indication for HARQ ACK timing, and the indication for HARQ ACK timing is applied to a first sub-slot PUCCH repetition from among the two or more sub-slot PUCCH repetitions. In one embodiment, subsequent sub-slot PUCCH repetitions from among the two or more sub-slot PUCCH repetitions occupy subsequent, consecutive available sub-slots.

In one embodiment, the one or more sub-slot PUCCH repetition configurations comprises two or more HARQ ACK timing values for the two or more sub-slot PUCCH repetitions, respectively.

In one embodiment, each sub-slot PUCCH repetition from among the two or more sub-slot PUCCH repetitions use a same resource allocation in the time domain across two or more consecutive, available sub-slots.

In one embodiment, each sub-slot PUCCH repetition from among the two or more sub-slot PUCCH repetitions is contained within a respective sub-slot.

In one embodiment, at least one sub-slot PUCCH repetition from among the two or more sub-slot PUCCH repetitions spans across a sub-slot boundary.

In one embodiment, at least one sub-slot PUCCH repetition from among the two or more sub-slot PUCCH repetitions spans across a slot boundary.

In one embodiment, a PUCCH resource for one of the two or more sub-slot PUCCH repetitions crosses a sub-slot boundary, and the one of the two or more sub-slot PUCCH repetitions is truncated to be within the sub-slot boundary.

In one embodiment, a PUCCH resource for one of the two or more sub-slot PUCCH repetitions crosses a slot boundary, and the one of the two or more sub-slot PUCCH repetitions is truncated to be within the slot boundary.

In one embodiment, the two or more sub-slot PUCCH repetitions are performed in a back-to-back manner without any symbols gaps between the two or more sub-slot PUCCH repetitions.

In one embodiment, at least one of the two or more sub-slot PUCCH repetitions is extended to reach a sub-slot boundary.

In one embodiment, receiving the two or more sub-slot PUCCH repetitions comprises receiving the two or more sub-slot PUCCH repetitions using frequency hopping. In one embodiment, the frequency hopping is inter-sub-slot frequency hopping, inter-slot frequency hopping, or intra-sub-slot frequency hopping.

In one embodiment, the one or more sub-slot PUCCH repetition configurations each comprise information that indicates a number of sub-slot PUCCH repetitions.

Corresponding embodiments of a base station are also disclosed. In one embodiment, a base station for sub-slot PUCCH repetitions is adapted to provide, to a wireless communication device, one or more sub-slot PUCCH repetition configurations and receive, from the wireless communication device, a PUCCH transmission in accordance with one of the one or more sub-slot PUCCH repetition configurations.

In one embodiment, a base station for sub-slot PUCCH repetitions comprises processing circuitry configured to cause the base station to provide, to a wireless communication device, one or more sub-slot PUCCH repetition configurations and receive, from the wireless communication device, a PUCCH transmission in accordance with one of the one or more sub-slot PUCCH repetition configurations.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 7 shows an example of how to include an indication for the number of repetitions for sub-slot PUCCH repetition in PUCCH-Resource, in accordance with one embodiment of the present disclosure;

FIG. 9 illustrates K1 indication and the number of repetitions for sub-slot PUCCH repetition being indicated in accordance with one embodiment of the present disclosure;

FIG. 10 shows multiple K1 indications for sub-slot PUCCH repetition in accordance with one embodiment of the present disclosure;

FIG. 18 shows an example of truncation of PUCCH resource which crosses the slot boundary in accordance with an embodiment of the present disclosure;

FIG. 19 shows an example of PUCCH segmentation for PUCCH transmission which crosses the slot boundary in accordance with an embodiment of the present disclosure;

FIGS. 29 through 32 are flow charts that illustrate example embodiments of methods implemented in a communication system such as that of FIG. 27.

DETAILED DESCRIPTION

Figure 1:
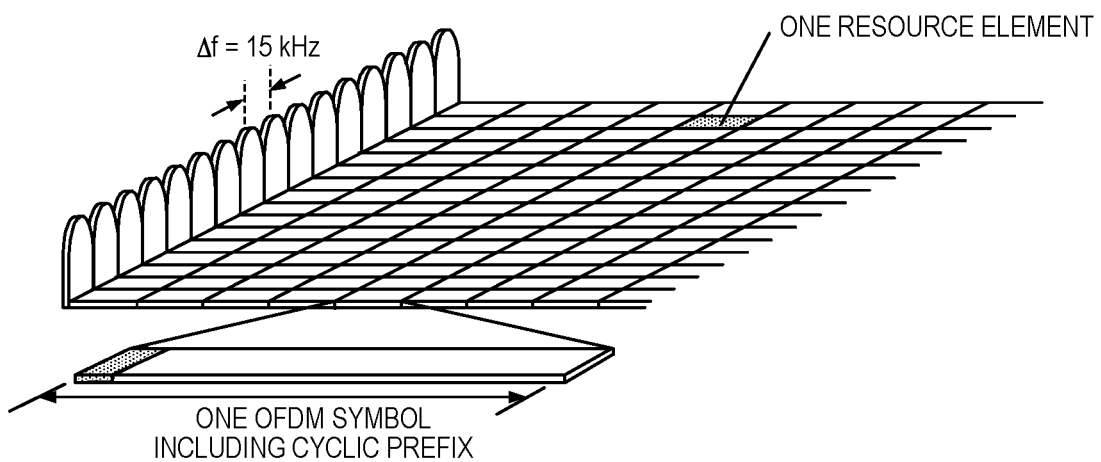
FIG. 1 illustrates an exemplary radio resource in New Radio (NR)
Figure 2:
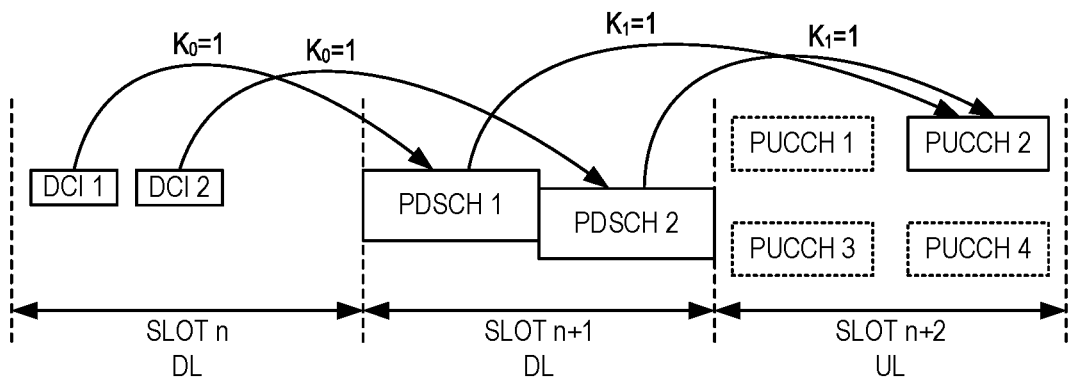
FIG. 2 illustrates an example Hybrid Automatic Repeat Request (HARQ) timeline for a simple scenario with two Physical Downlink Shared Channels (PDSCHs) and one feedback.
Figure 3:
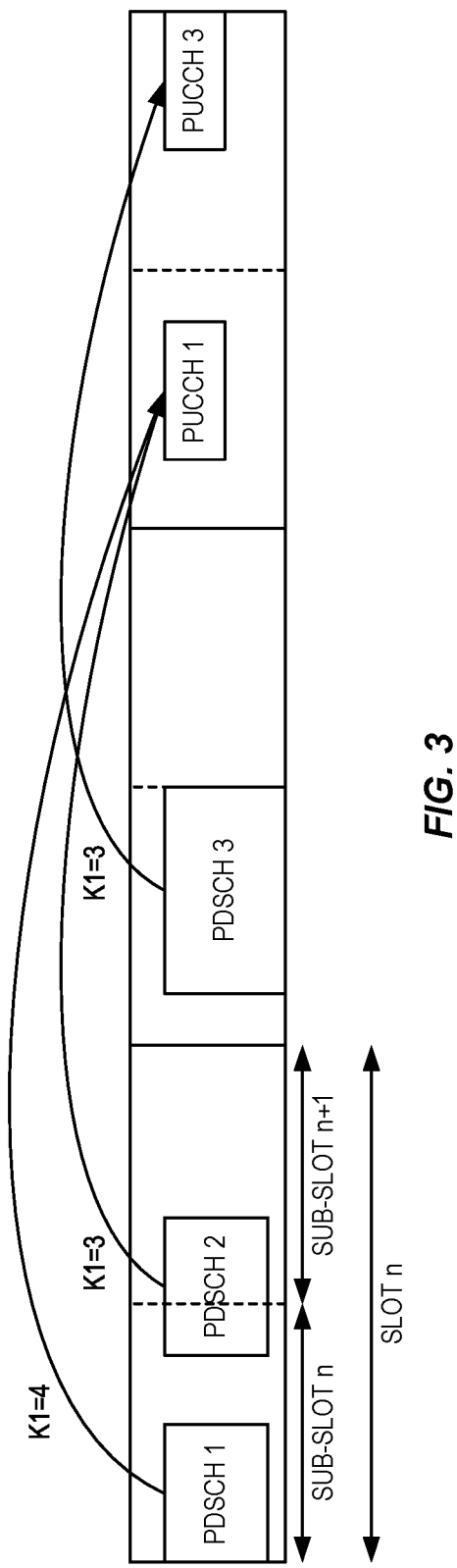
FIG. 3 shows an example of K1 indication based on sub-slots with "7-symbol*2" configuration for two Physical Uplink Control Channels (PUCCHs) in two sub-slots that carry the HARQ feedback of PDSCH transmissions.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s) with respect to Physical Uplink Control Channel (PUCCH) transmission, e.g., in 3GPP NR. Restricting a PUCCH transmission to be contained within a sub-slot reduces coverage compared to allowing longer PUCCH transmissions. PUCCH repetition or allowing sub-slot PUCCH to cross a sub-slot boundary have been proposed as potential solutions. However, for PUCCH repetition, it is still not clear how to handle PUCCH resources for the repetitions and how to indicate the number of repetitions. For a PUCCH crossing sub-slot boundary, it is still not clear how to handle PUCCH resource of the last sub-slot in a slot potentially crossing a slot boundary.

Certain aspects of the present disclosure and their embodiments may provide solutions to the aforementioned or other challenges. The proposed solutions allow sub-slot PUCCH to be repeated with dynamic indication of the number of repetitions and handle any potential collision of PUCCH resource of the repetitions.

Embodiments of a method to handle PUCCH resource crossing a slot boundary, e.g., by truncating the resource at the slot boundary or by segmenting the PUCCH transmission into two PUCCH transmissions around the slot boundary, are also disclosed.

Embodiments disclosed herein allow for PUCCH transmissions spanning more than one sub-slot while solving potential collision problems.

Certain embodiments may provide one or more of the following technical advantage(s). Embodiments of the solutions proposed herein allow for sub-slot PUCCH transmissions to be more reliable or have better coverage.

Figure 4:
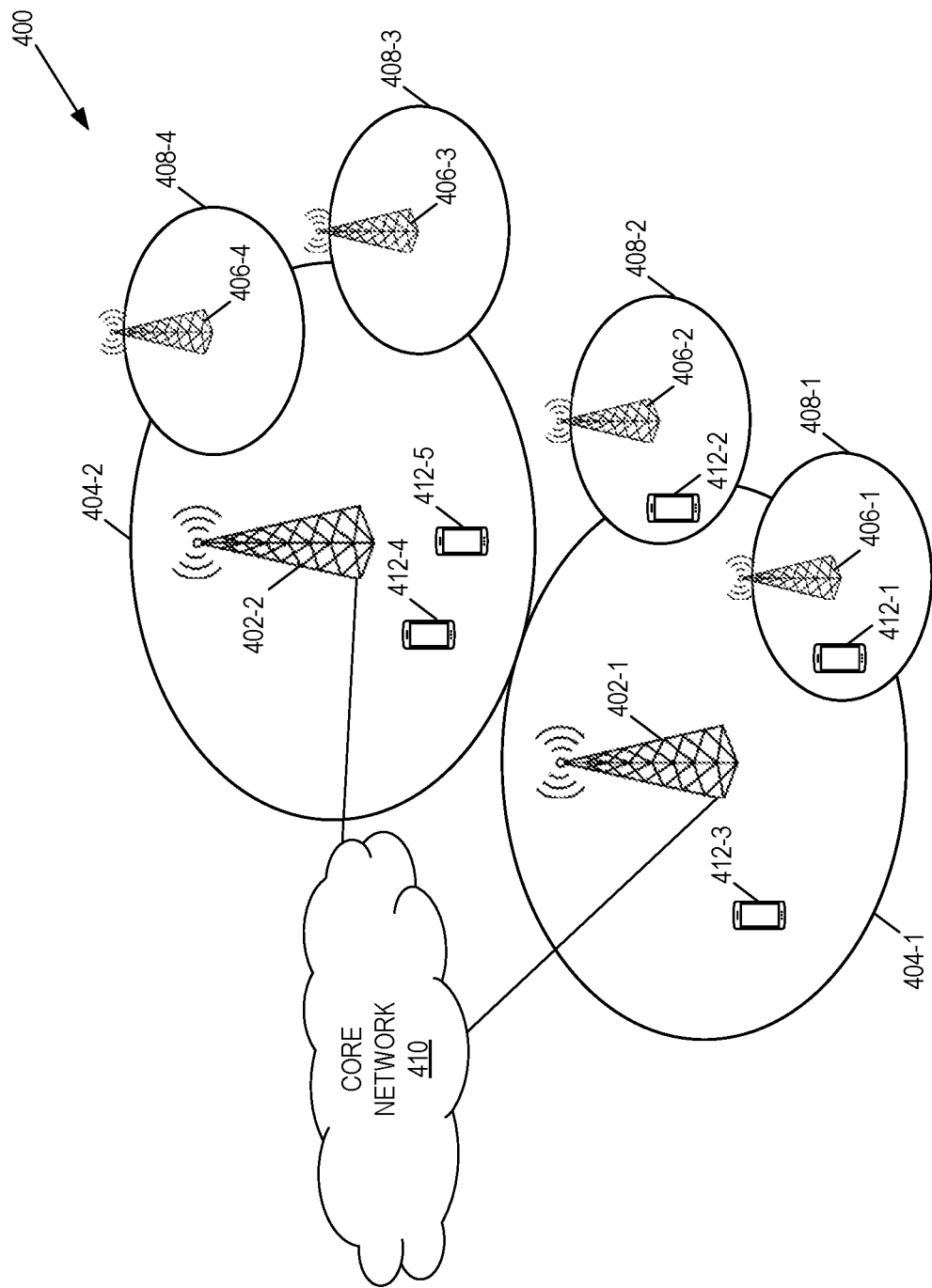
FIG. 4 illustrates one example of a cellular communications system in which embodiments of the present disclosure may be implemented.

FIG. 4 illustrates one example of a cellular communications system 400 in which embodiments of the present disclosure may be implemented. In the embodiments described herein, the cellular communications system 400 is a 5G System (5GS) including a Next Generation Radio Access Network (NG-RAN) that uses the NR radio access technology (RAT). In this example, the RAN includes base stations 402-1 and 402-2, which for the NG-RAN include NR base stations (gNBs) and, optionally next generation eNBs (ng-eNBs) (i.e., LTE RAN nodes connected to the 5GC), controlling corresponding (macro) cells 404-1 and 404-2. The base stations 402-1 and 402-2 are generally referred to herein collectively as base stations 402 and individually as base station 402. Likewise, the (macro) cells 404-1 and 404-2 are generally referred to herein collectively as (macro) cells 404 and individually as (macro) cell 404. The RAN may also include a number of low power nodes 406-1 through 406-4 controlling corresponding small cells 408-1 through 408-4. The low power nodes 406-1 through 406-4 can be small base stations (such as pico or femto base stations) or Remote Radio Heads (RRHs), or the like. Notably, while not illustrated, one or more of the small cells 408-1 through 408-4 may alternatively be provided by the base stations 402. The low power nodes 406-1 through 406-4 are generally referred to herein collectively as low power nodes 406 and individually as low power node 406. Likewise, the small cells 408-1 through 408-4 are generally referred to herein collectively as small cells 408 and individually as small cell 408. The cellular communications system 400 also includes a core network 410, which in the 5GS is referred to as the 5G Core (5GC). The base stations 402 (and optionally the low power nodes 406) are connected to the core network 410.

The base stations 402 and the low power nodes 406 provide service to wireless communication devices 412-1 through 412-5 in the corresponding cells 404 and 408. The wireless communication devices 412-1 through 412-5 are generally referred to herein collectively as wireless communication devices 412 and individually as wireless communication device 412. In the following description, the wireless communication devices 412 are oftentimes UEs, but the present disclosure is not limited thereto.

Now a more detailed description of embodiments of the solutions proposed herein is provided. Note that while the following description is provided using a number of "headings", the embodiments described below under these headings may be used separately or in any desired combination.

I. Sub-Slot PUCCH Repetition

The following embodiments are given to support PUCCH repetition over multiple consecutive sub-slots.

Figure 5:
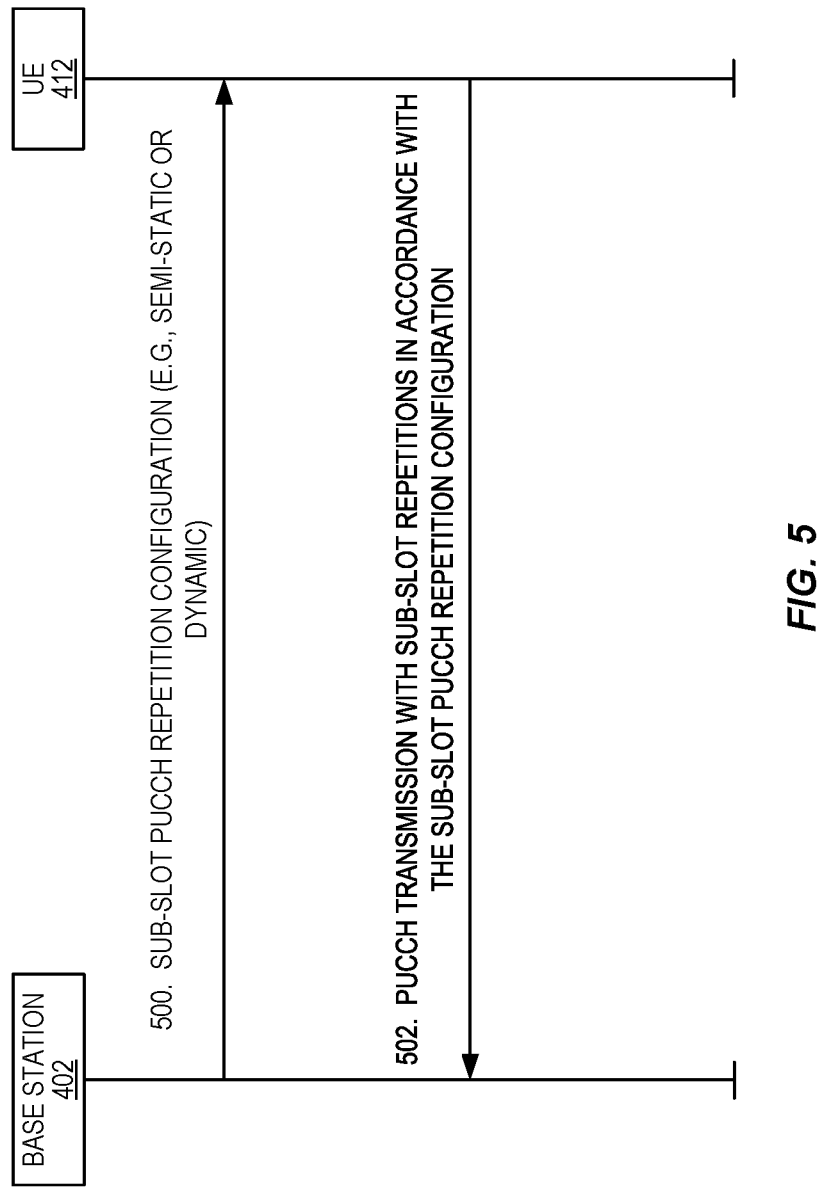
FIG. 5 illustrates the operation of a base station and a User Equipment (UE) to provide slot-based PUCCH repetitions in accordance with some embodiments of the present disclosure.

FIG. 5 illustrates the operation of a base station 402 and a UE 412 to provide slot-based PUCCH repetitions in accordance with some embodiments of the present disclosure. As illustrated, the base station 402 provides a sub-slot PUCCH repetition configuration to the UE 412 (step 500). As described below in detail, the sub-slot PUCCH repetition configuration may be a semi-static configuration (see section I(a) below) or a dynamic configuration (see section I(b) below). The sub-slot PUCCH repetition configuration may include, for example, information that indicates a number of repetitions for the sub-slot PUCCH repetition configuration and/or a number of sub-slots for the sub-slot PUCCH repetition configuration. However, further details are provided below. The UE 412 then transmits a PUCCH transmission with sub-slot repetitions in accordance with the sub-slot PUCCH repetition configuration (step 502).

a. Semi-Statically Configured Per PUCCH Format or Per PUCCH Resource

In one non-limiting embodiment, sub-slot based PUCCH repetition is semi-statically configured (e.g., Radio Resource Control (RRC) configured) for each PUCCH format individually by a new parameter, e.g., a new RRC parameter nrofSubSlots (separately from the parameter nrofSlots) in PUCCH-FormatConfig. Different PUCCH formats may be given different values for this new parameter. For the remainder of this discussion, this new parameter is the nrofSubSlots parameter described above. In this embodiment, for a given PUCCH-Config, all PUCCH resources of a given format use the same nrofSubSlotsvalue. For example, for a given PUCCH-Config, all PUCCH resources of format 1, with different PUCCH-ResourceSetId, use the same nrofSubSlots provided in PUCCH-FormatConfig for format 1. Similarly, all PUCCH resources of format 2, with different PUCCH-ResourceSetId, use the same nrofSubSlots provided in PUCCH-FormatConfig for format 2.

In one non-limiting embodiment, a UE does not expect to be configured with both sub-slot and slot PUCCH repetition in PUCCH-FormatConfig.

One example RRC configuration is shown below.

| PUCCH-FormatConfig ::= | SEQUENCE { |
|---|---|
| interslotFrequencyHopping | ENUMERATED {enabled} |
| OPTIONAL, -- Need R | |
| additionalDMRS | ENUMERATED {true} |
| OPTIONAL, -- Need R | |
| maxCodeRate | PUCCH-MaxCodeRate |
| OPTIONAL, -- Need R | |
| nrofSlots | ENUMERATED {n2,n4,n8} |
| OPTIONAL, -- Need S | |
| nrofSubSlots | ENUMERATED |
| {n2,n4,n8,n16} OPTIONAL, -- Need S | |
| pi2BPSK | ENUMERATED {enabled} |
| OPTIONAL, -- Need R | |
| simultaneousHARQ-ACK-CSI | ENUMERATED {true} |
| OPTIONAL -- Need R | |
| } | |

Figure 6A:
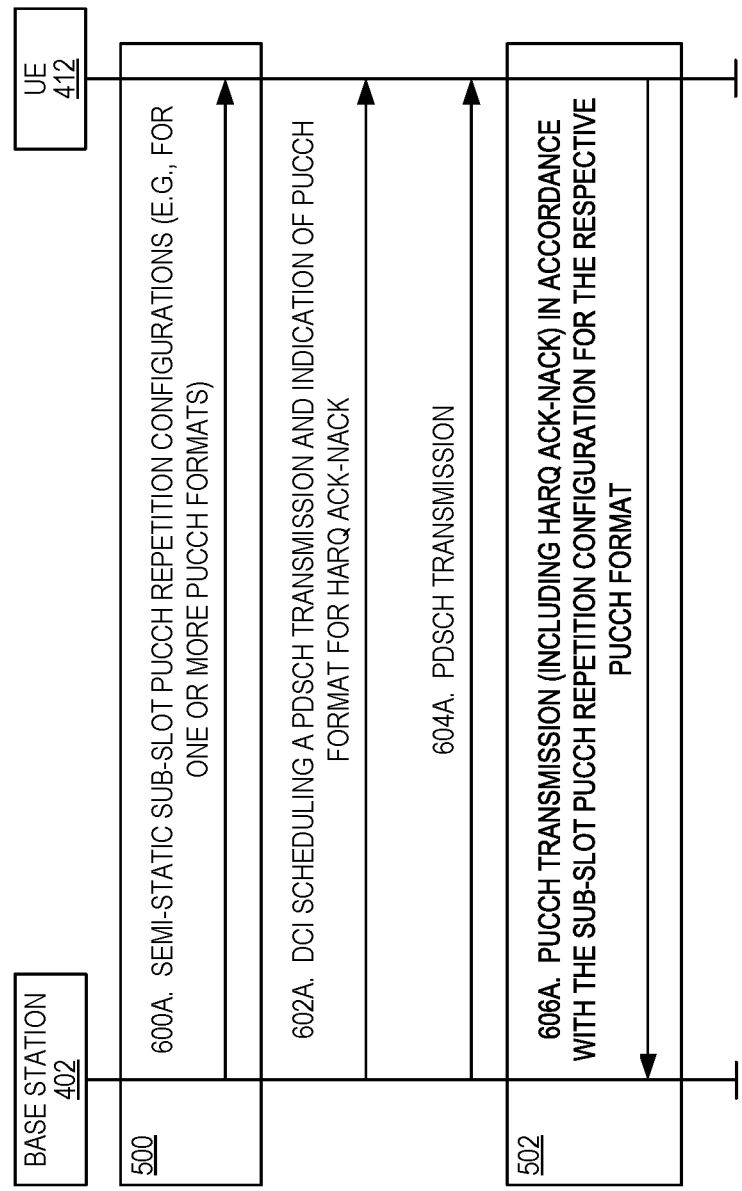
FIG. 6A illustrates one example of the operation of a base station and a UE to provide a semi-static slot-based PUCCH repetition configuration in accordance with some embodiments of the present disclosure.

FIG. 6A illustrates one example of the operation of a base station 402 and a UE 412 to provide a semi-static slot-based PUCCH repetition configuration in accordance with some embodiments of the present disclosure. Optional steps are represented by dashed lines/boxes. As illustrated, the base station 402 sends semi-static sub-slot PUCCH repetition configurations to the UE 412 (step 600A). As discussed above, in one embodiment, the semi-static sub-slot PUCCH repetition configurations are provided via RRC signaling (e.g., via parameter nrofSubSlots in PUCCH-FormatConfig). As also discussed above, the configurations may include separate sub-slot PUCCH repetition configurations (e.g., separate nrofSubSlots values) for multiple PUCCH formats. The base station 402 also sends a DCI message to the UE 412 that schedules a PDSCH transmission and includes an indication of a particular PUCCH format to be used for transmission for the associated HARQ ACK-NACK (step 602A). The base station 402 transmits the scheduled PDSCH transmission to the UE 412 (step 604A). At the UE 412, the UE 412 transmits a PUCCH transmission with sub-slot PUCCH repetitions in accordance with a select one of the sub-slot PUCCH repetition configurations (step 606A). As discussed above, in one embodiment, the selected sub-slot PUCCH repetition configuration is one of the semi-statically configured sub-slot PUCCH repetition configurations provided for the PUCCH format indicated in the DCI. Note that other aspects described above related to the semi-static configuration of the sub-slot PUCCH repetition configuration are also applicable to FIG. 6A.

In another embodiment, one or more semi-static sub-slot PUCCH repetition configurations are associated to one or more PUCCH resources, respectively. In other words, in another embodiment, different PUCCH resources may be given different semi-static sub-slot PUCCH repetition configurations (e.g., different numbers of sub-slots for PUCCH repetitions).

Figure 6B:
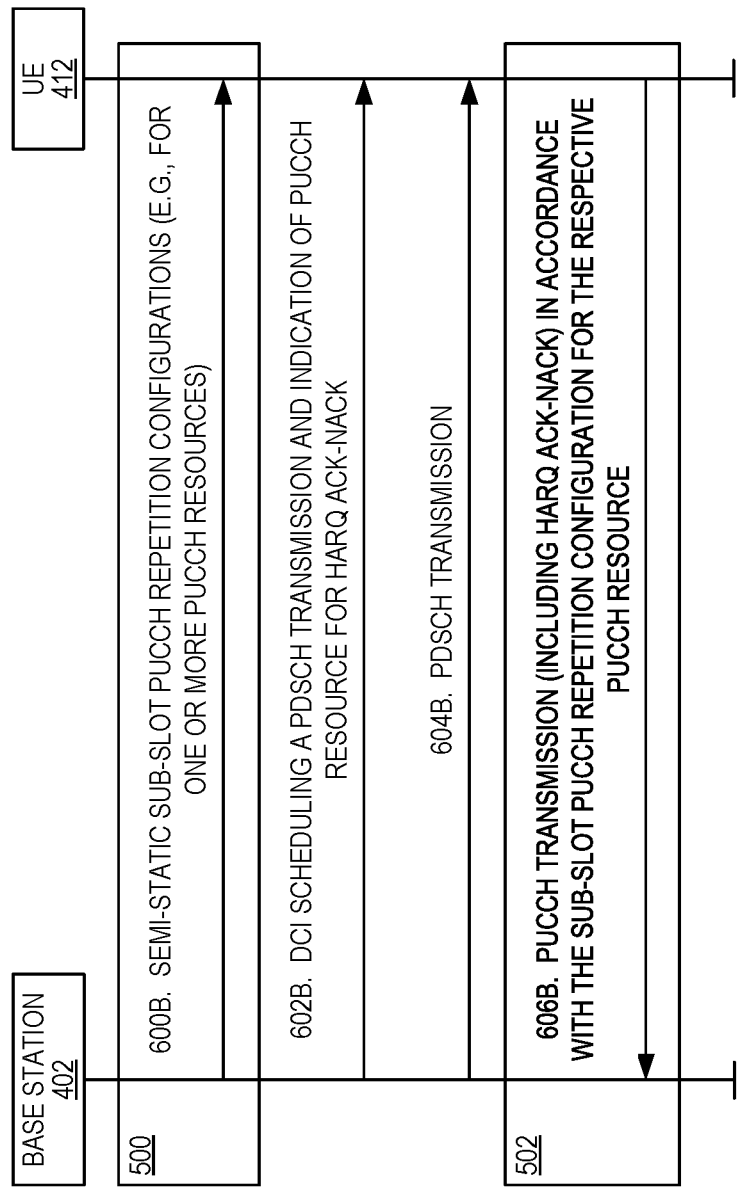
FIG. 6B illustrates one example of the operation of a base station and a UE to provide a semi-static slot-based PUCCH repetition configuration in accordance with some other embodiments of the present disclosure.

FIG. 6B illustrates one example of the operation of a base station 402 and a UE 412 to provide a semi-static slot-based PUCCH repetition configuration in accordance with some embodiments of the present disclosure. Optional steps are represented by dashed lines/boxes. As illustrated, the base station 402 sends semi-static sub-slot PUCCH repetition configurations to the UE 412 (step 600B). As discussed above, in one embodiment, the semi-static sub-slot PUCCH repetition configurations are provided via RRC signaling (e.g., via parameter nrofSubSlots in PUCCH-FormatConfig). As also discussed above, the configurations may include separate sub-slot PUCCH repetition configurations (e.g., separate nrofSubSlots values) for multiple PUCCH resources. The base station 402 also sends a DCI message to the UE 412 that schedules a PDSCH transmission and includes an indication of a particular PUCCH resource to be used for transmission for the associated HARQ ACK-NACK (step 602B). The base station 402 transmits the scheduled PDSCH transmission to the UE 412 (step 604B). At the UE 412, the UE 412 transmits a PUCCH transmission with sub-slot PUCCH repetitions in accordance with a select one of the sub-slot PUCCH repetition configurations (step 606B). As discussed above, in one embodiment, the selected sub-slot PUCCH repetition configuration is one of the semi-statically configured sub-slot PUCCH repetition configurations provided for the PUCCH resource indicated in the DCI. Note that other aspects described above related to the semi-static configuration of the sub-slot PUCCH repetition configuration are also applicable to FIG. 6B.

b. Dynamically Indicated in the DCI

In one non-limiting embodiment, sub-slot PUCCH repetitions are indicated dynamically. In one particular embodiment, the sub-slot PUCCH repetitions are indicated dynamically in the DCI scheduling PDSCH or activating DL SPS.

In one version of the above embodiment, an indication is through a new separate field in the DCI formats scheduling PDSCH or activating DL SPS, e.g., formats 1_0, 1_1, and 1_2. The indication can include the number of repetitions. In one embodiment, the new separate field is added to non-fallback DCI formats only (e.g., 1_1 and 1_2), whereas for the fallback DCI format, the number of sub-slot PUCCH repetitions is either pre-defined in the specification, or provided via another parameter (e.g., a higher layer signaling parameter such as, e.g., an RRC parameter).

In another embodiment, a parameter (e.g., a higher-layer parameter such as, e.g., an RRC parameter) is configured to provide a set of possible values for the number of sub-slot repetitions, for example, nrofSubSlotsSet of {1, 2, 4, 8}. Then a DCI field selects one value from the set of possible values. For example, a 2-bit DCI field (named, as an example, "nrofSubSlot Indicator") can select one value from four possible values. Additionally, the presence, and/or the field size of "nrofSubSlot Indicator" can be RRC configurable, for example, the DCI field size is configurable to be 0, 1, or 2 bits.

In another version of the above embodiment, an indication is through the PUCCH resource indicator (PRI) field by selecting a specific PUCCH resource entry from the configured PUCCH resources. An example of the PUCCH resource configuration containing the repetition number is given in FIG. 7. FIG. 7 shows an example of how to include an indication for the number of repetitions for sub-slot PUCCH repetition in PUCCH-Resource. That is, a new RRC parameter, e.g., repetitionNum, is added to the PUCCH-Resource which forms PUCCH resources in a PUCCH resource set. If PUCCH-ResourceId containing such repetition number is selected by the PRI in the DCI, PUCCH transmission is repeated by the indicated number of times.

In one non-limiting embodiment, the value of repetition number can be in the unit of sub-slot or slot. Accordingly, PUCCH transmission is repeated over multiple sub-slots or slots depending on the indication. For example, if the PUCCH configuration is provided with sub-slot configuration, e.g., subslotLengthForPUCCH-r16 is set to 'n2' or 'n7', then the repetition is interpreted as repeating across adjacent, available, sub-slots. Otherwise, if sub-slot configuration is absent (thus using the default of slot-based PUCCH), then the repetition is interpreted as repeating across adjacent, available, slots.

In one non-limiting embodiment, if a UE is configured with a PUCCH resource with a certain PUCCH format containing an indication of repetition number, e.g., repetitionNum in PUCCH Resource, the UE does not expect to be configured with nrofSubSlots in PUCCH-FormatConfig for that PUCCH format.

Figure 8:
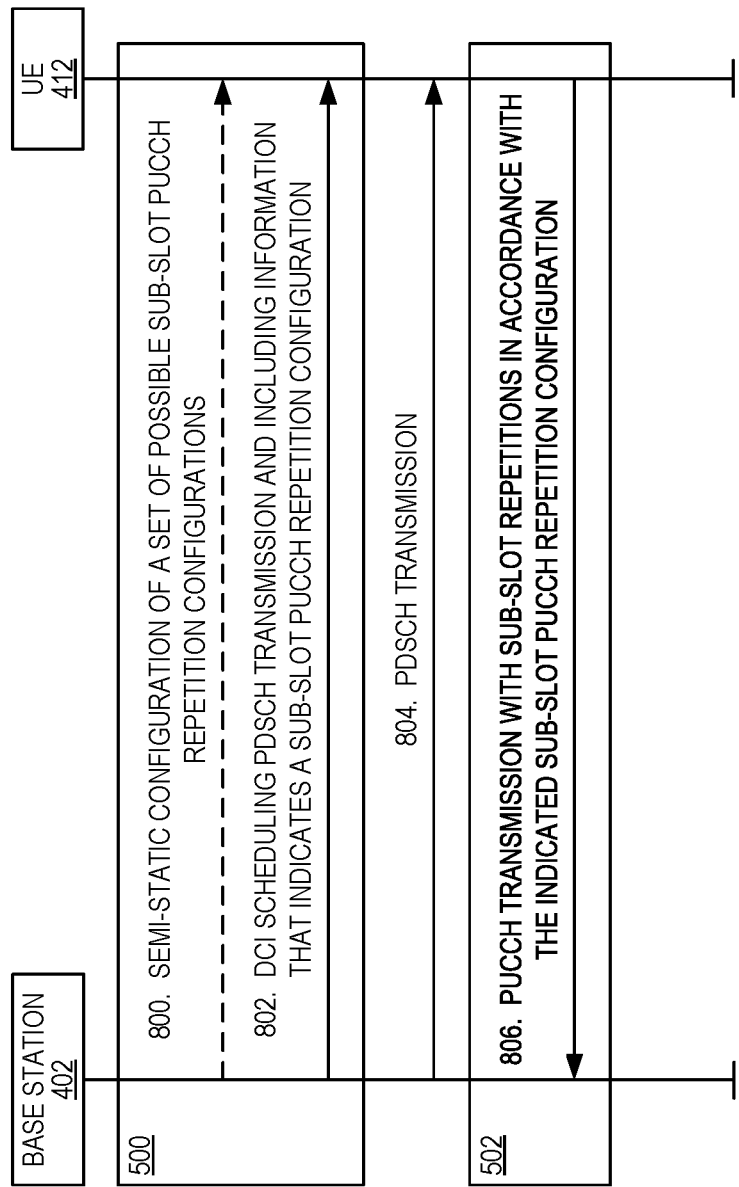
FIG. 8 illustrates one example of the operation of a base station and a UE to provide a dynamic slot-based PUCCH repetition configuration in accordance with some embodiments of the present disclosure.

FIG. 8 illustrates one example of the operation of a base station 402 and a UE 412 to provide a dynamic slot-based PUCCH repetition configuration in accordance with some embodiments of the present disclosure. Optional steps are represented by dashed lines/boxes. As illustrated, the base station 402 optionally sends one or more (preferably two or more) semi-static sub-slot PUCCH repetition configurations to the UE 412 (step 800). As discussed above, in one embodiment, the semi-static sub-slot PUCCH repetition configurations are provided via RRC signaling (e.g., via parameter repetitionNum in PUCCH-Resource). The base station 402 also sends a DCI message to the UE 412 that schedules a PDSCH transmission and includes an indication of a sub-slot PUCCH repetition configuration to be used for transmission for the associated HARQ ACK-NACK (step 802). As discussed above, in some embodiments, the DCI includes the sub-slot PUCCH repetition configuration (e.g., number of sub-slots or number of repetitions). As also discussed above, in some other embodiments, the DCI includes an indication (e.g., index number) of one of the semi-statically configured sub-slot PUCCH repetition configurations (from step 800) that is to be used. The base station 402 transmits the scheduled PDSCH transmission to the UE 412 (step 604). At the UE 412, the UE 412 transmits a PUCCH transmission with sub-slot PUCCH repetitions in accordance with the sub-slot PUCCH repetition configuration indicated by the DCI (step 806). As discussed above, in one embodiment, the selected sub-slot PUCCH repetition configuration is one of the semi-statically configured sub-slot PUCCH repetition configurations provided for the PUCCH format indicated in the DCI. Note that other aspects described above related to the dynamic configuration of the sub-slot PUCCH repetition configuration are also applicable to FIG. 8.

c. HARQ-ACK Timing for Sub-Slot PUCCH Repetition

In one non-limiting embodiment, if a UE is indicated/configured to report HARQ-ACK with sub-slot PUCCH repetitions, the indication for HARQ-ACK timing K1 (e.g., in the DCI of step 602 or the DCI of step 802) is applied to the first PUCCH in the repetitions. See FIG. 9, which illustrates K1 indication and the number of repetitions for sub-slot PUCCH repetition are indicated. The K1 value is applied only to the first repetition. Remaining repetitions follows in consecutive sub-slots.

The subsequent repetitions of PUCCH occupy subsequent, consecutively available sub-slots.

In one non-limiting embodiment, for a UE indicated/configured to report HARQ-ACK with sub-slot PUCCH repetitions, multiple values of indication for HARQ-ACK timing K1 is indicated to the UE (e.g., in the DCI of step 602 or the DCI of step 802) for different PUCCH transmissions in the repetitions. For this case, the number of sub-slot PUCCH repetitions may also be implied from the number of indicated K1 values. See FIG. 10, which shows multiple K1 indications for sub-slot PUCCH repetition are indicated. Each K1 value is applied to each PUCCH repetition. In this example, the number of sub-slot PUCCH repetitions can be implied from the number of indicated K1 values.

d. Resource Usage

In one non-limiting embodiment, each repetition of the sub-slot PUCCH repetition across multiple consecutive, available, sub-slots use the same resource allocation in time domain (e.g., number of consecutive symbols and starting symbol in the sub-slot). The PUCCH resource is indicated by the PRI field in the DCI (e.g., in the DCI of step 602 or the DCI of step 802). See FIG. 11, which shows the same PUCCH resource allocation is used for two sub-slot PUCCH repetitions.

In one version of the above embodiment, PUCCH resources configured for sub-slot PUCCH repetition are contained within a sub-slot.

In another version of the above embodiment, PUCCH resources configured for sub-slot PUCCH repetition are allowed to span across sub-slot boundary.

Figure 11:
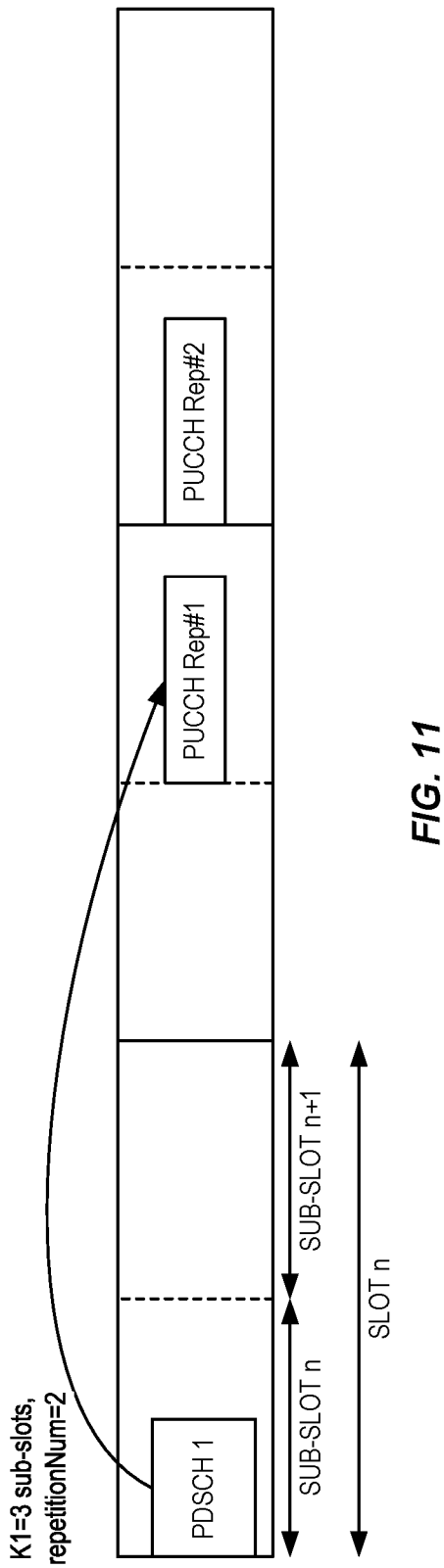
FIG. 11 shows an embodiment in which the same PUCCH resource allocation is used for two sub-slot PUCCH repetitions.

In another embodiment, the repetitions of a PUCCH may cross the slot boundary. The sub-slot repetitions of a PUCCH are counted in units of sub-slots. Thus, it may start at one sub-slot location of slot j, and end at a same or different sub-slot location of slot k, k>j. As shown in FIG. 11, the PUCCH repetitions start at the $2^{nd}$ sub-slot of slot j and end at the first sub-slot of slot (j+1).

In case that an indicated PUCCH resource for PUCCH repetition spans across sub-slot boundary and/or slot boundary, the PUCCH resource is truncated to be within the sub-slot and/or slot-boundary.

Figure 12:
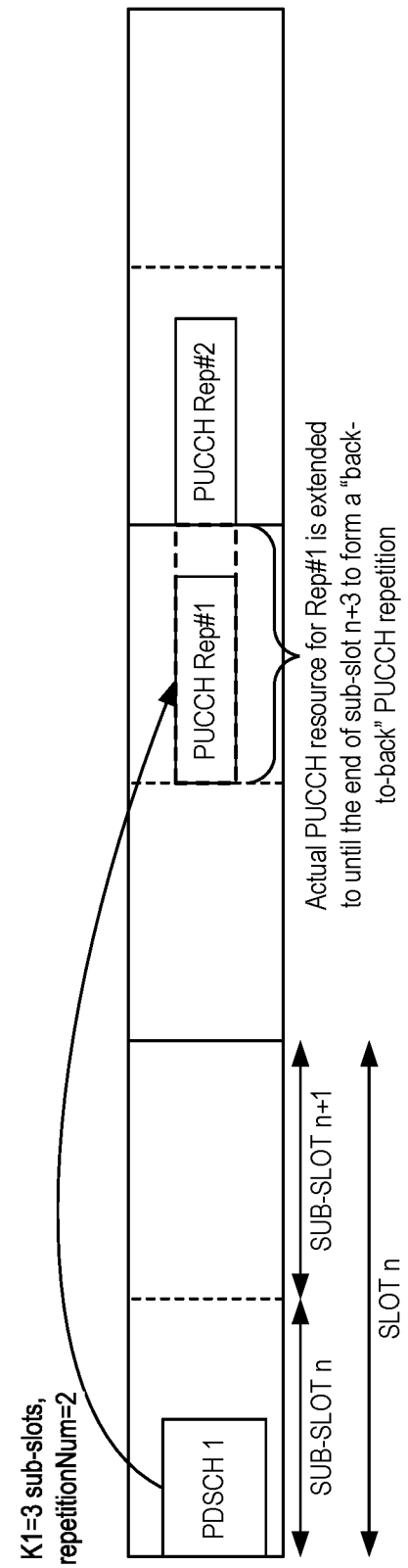
FIG. 12 shows an example of extending PUCCH resource for some PUCCH repetition to form a "back-to-back" PUCCH repetitions in accordance with an embodiment of the present disclosure.

In one non-limiting embodiment, PUCCH repetitions for sub-slot is performed in a back-to-back manner without any symbol gaps between repetitions. The back-to-back PUCCH repetition can be semi-statically configured. Once configured, the PUCCH resource for a sub-slot PUCCH repetition is extended in time domain, if applicable, to the end of the sub-slot and/or the beginning of the sub-slot. The newly extended PUCCH resource is then used for PUCCH transmission in the sub-slot where the UE procedure for reporting HARQ-ACK on PUCCH is updated with the new PUCCH resource. The PUCCH format remains the same. See FIG. 12, which shows an example of extending PUCCH resource for some PUCCH repetition to form a "back-to-back" PUCCH repetition. Here, the indicated PUCCH resource is shorter than the sub-slot length. If the back-to-back PUCCH repetition is configured, since there would be a symbol gap between two repetitions, PUCCH resource of the first repetition is extended in time domain to span the whole sub-slot.

In one version of the above embodiment, only PUCCH resource with the long PUCCH formats 1, 3, and 4 can be extended. For the formats which allow UE multiplexing, e.g., formats 1 and 4, the parameters timeDomainOCC, occ_Length and occ-Index can either remain the same or change according to certain rules in the specification.

e. Sub-Slot PUCCH Frequency Hopping

In one non-limiting embodiment, the UE is configured by a new RRC parameter, e.g., intersubslotFrequencyHopping, whether or not to perform frequency hopping for PUCCH repetition in different sub-slots. If the UE is configured to perform frequency hopping for PUCCH repetition across different sub-slots, the UE performs frequency hopping between adjacent sub-slots.

For frequency hopping for PUCCH repetition across different sub-slots, the same mechanism based on different starting Physical Resource Blocks (PRBs) as in NR Release 15 frequency hopping for PUCCH transmission over multiple slots can be used. That is, the UE transmits the PUCCH starting from a first PRB, provided by startingPRB, in sub-slots with even number and starting from the second PRB, provided by secondHopPRB, in sub-slots with odd number. The sub-slot indicated to the UE for the first PUCCH transmission has number 0 and each subsequent sub-slot until the UE transmits the PUCCH in repeat PUCCH N sub-slots is counted regardless of whether or not the UE transmits the PUCCH in the sub-slot.

Figure 13:
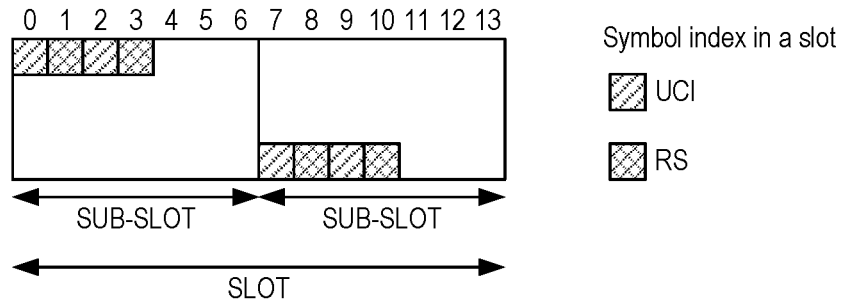
FIG. 13 shows an example of PUCCH inter-sub-slot frequency hopping, without intra-sub-slot frequency hopping, in accordance with an embodiment of the present disclosure.

In one non-limiting embodiment, if the UE is configured to perform frequency hopping for PUCCH repetition across different sub-slots, the UE does not expect to be configured to perform frequency hopping for a PUCCH transmission within a sub-slot. This is illustrated with an example in FIG. 13. In particular, FIG. 13 shows an example of PUCCH inter-sub-slot frequency hopping, without intra-sub-slot frequency hopping. Within a sub-slot, the PUCCH repetition has duration of 4 symbols. The sub-slot duration is 7 symbols.

In one non-limiting embodiment, if the UE is configured to perform frequency hopping for PUCCH repetition across different sub-slots with IntersubslotFrequencyHopping, the UE ignores the frequency hopping configuration interslotFrequencyHopping.

Figure 14:
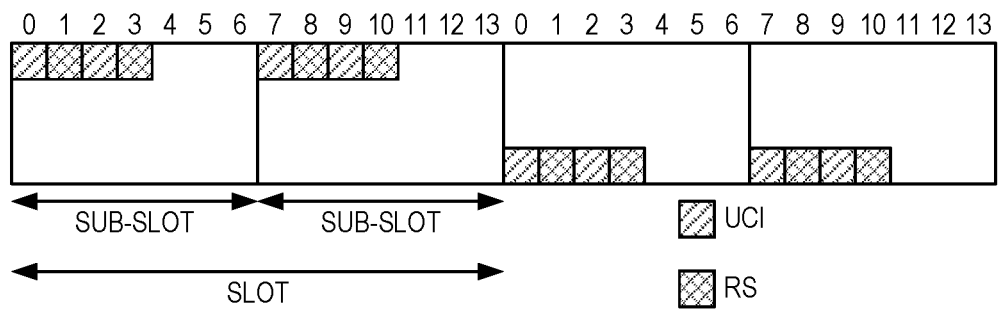
FIG. 14 shows an example of PUCCH inter-slot frequency hopping, without inter-sub-slot frequency hopping, in accordance with an embodiment of the present disclosure.

In one non-limiting embodiment, if the UE is configured to perform PUCCH repetition across different sub-slots and is only configured with interslotFrequencyHopping, the UE performs frequency hopping per slot. The NR Release 15 frequency hopping for PUCCH over multiple slots is applied to a group of sub-slots in different slots. That is, the first PRB of each sub-slot PUCCH repetitions within the same slot is the same. This is illustrated with an example in FIG. 14. In particular, FIG. 14 shows an example of PUCCH inter-slot frequency hopping, without inter-sub-slot frequency hopping. Within a sub-slot, the PUCCH repetition has duration of 4 symbols. The sub-slot duration is 7 symbols.

Figure 15:
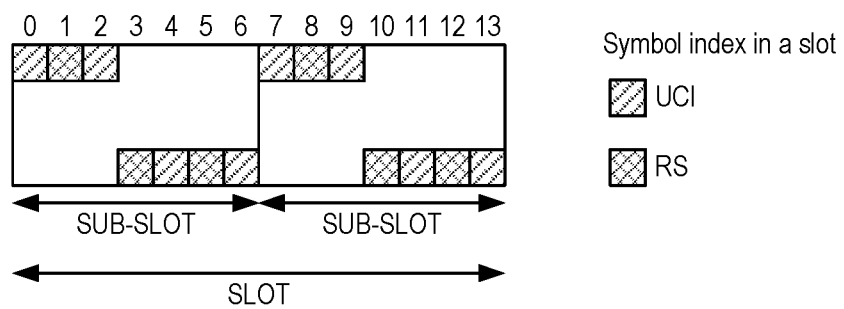
FIG. 15 shows an example of PUCCH inter-sub-slot frequency hopping, additionally with intra-sub-slot frequency hopping, in accordance with an embodiment of the present disclosure.

In another embodiment, if a PUCCH format spans a relatively large number of symbols, e.g., 4-7 symbols, in a sub-slot, then the intra-sub-slot frequency hopping may be configured as well. This is illustrated with an example in FIG. 15. In particular, FIG. 15 shows an example of PUCCH inter-sub-slot frequency hopping, additionally with intra-sub-slot frequency hopping. Within a sub-slot, the PUCCH repetition has duration of 7 symbols, with intra-sub-slot frequency hopping at approximately the middle of the PUCCH repetition. The sub-slot duration is 7 symbols.

Figure 16:
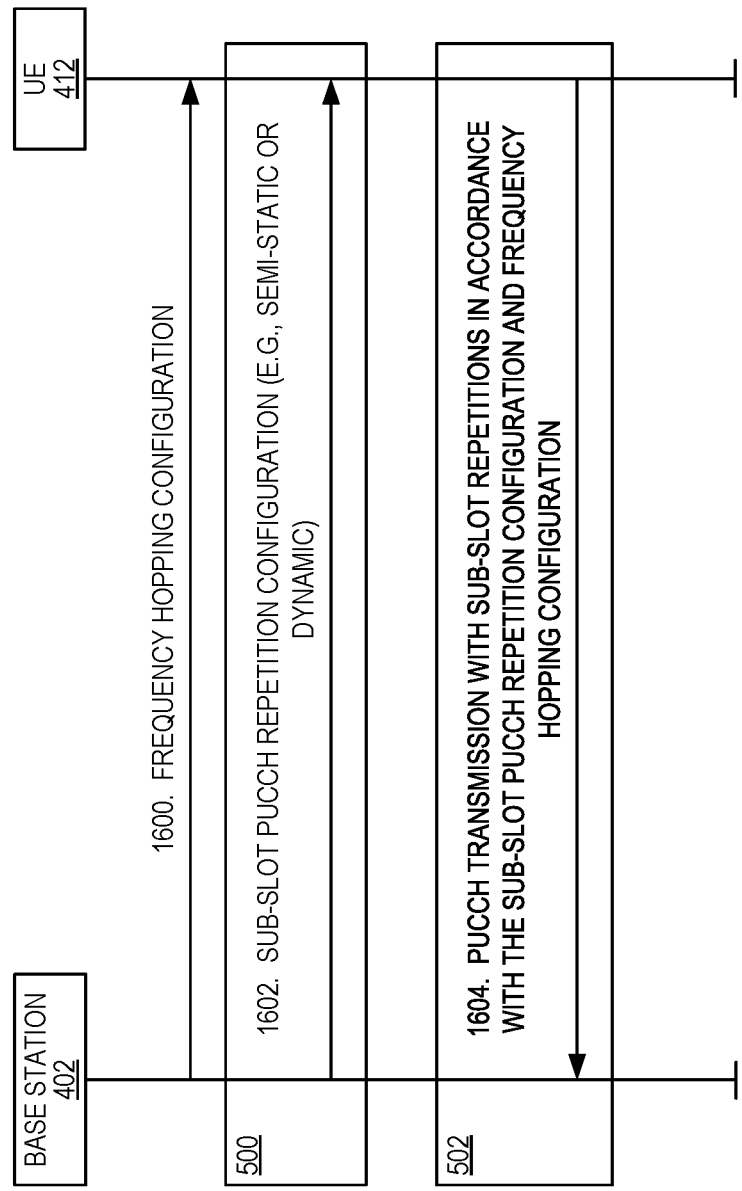
FIG. 16 illustrates the operation of a base station and a UE to provide slot-based PUCCH repetitions in accordance with some embodiments of the present disclosure.

FIG. 16 illustrates the operation of a base station 402 and a UE 412 to provide slot-based PUCCH repetitions in accordance with some embodiments of the present disclosure. As illustrated, the base station 402 provides, to the UE 412, a frequency hopping configuration that is applicable for sub-slot PUCCH repetitions, as described above (step 1600). The base station 402 also provides a sub-slot PUCCH repetition configuration to the UE 412 (step 1602). As described above, the sub-slot PUCCH repetition configuration may be a semi-static configuration (see section I(a) below) or a dynamic configuration (see section I(b) below). The sub-slot PUCCH repetition configuration may include, for example, information that indicates a number of repetitions for the sub-slot PUCCH repetition configuration and/or a number of sub-slots for the sub-slot PUCCH repetition configuration. However, further details are provided above. The UE 412 then transmits a PUCCH transmission with sub-slot repetitions in accordance with the sub-slot PUCCH repetition configuration and the frequency hopping configuration, as described above (step 1604).

f. Collision Handling

If one or more symbols to be occupied by a PUCCH sub-slot repetition are deemed unavailable, then that PUCCH sub-slot repetition is not transmitted. The dropping behavior of a PUCCH sub-slot repetition is performed on a sub-slot by sub-slot basis, i.e., dropping of one PUCCH repetition does not automatically cause other PUCCH repetitions to be dropped. One or more symbols may be unavailable due to several reasons, for example, a) the DL symbols or slots due to semi-statically configured TDD UL/DL pattern;
  b) the DL symbols or slots due to TDD UL/DL pattern dynamically signaled via SFI;
  c) the DL symbols or slots configured by the invalid symbol pattern;
  d) the symbols used as gap due to uplink-to-downlink or downlink-to-uplink transmission;
  e) the symbols or sub-slots or slots occupied by other, higher-priority, uplink transmission;

In one non-limiting embodiment, if one of the sub-slot PUCCH repetition collides with other UL transmission, PUCCH transmission in that sub-slot is dropped. The remaining of the PUCCH repetitions, if any, are transmitted.

In one non-limiting embodiment, if one of the sub-slot PUCCH repetition falls into an invalid sub-slot (sub-slot belonging to DL slot as semi-statically configured by a TDD pattern or dynamically indicated by SFI), PUCCH transmission in that sub-slot is dropped. The remaining of the PUCCH repetitions, if any, are transmitted.

In one non-limiting embodiment, a sub-slot is counted as part of the number of repetitions regardless of whether PUCCH is transmitted in the sub-slot.

In another embodiment, a sub-slot is counted as part of the number of repetitions only if PUCCH is transmitted in the sub-slot.

In one non-limiting embodiment, if one or more of the sub-slot PUCCH repetition collide with PUSCH transmission, HARQ-ACK intended for those PUCCH are multiplexed onto the PUSCH. The multiplexing can be done based on the priorities of the PUCCHs and PUSCH.

In one non-limiting embodiment, if one of the sub-slot PUCCH repetitions collides with other sub-slot PUCCH, either PUCCH multiplexing or PUCCH prioritization (dropping one of the two) for that sub-slot is done based on the priorities of the two or more PUCCHs.

In one non-limiting embodiment, if one of the sub-slot PUCCH repetitions collides with other sub-slot PUCCH with same priority, PUCCH corresponding to the earlier PDSCH (e.g., the PDSCH which starts earlier, or the PDSCH scheduled by an earlier PDCCH) is dropped.

Figure 17:
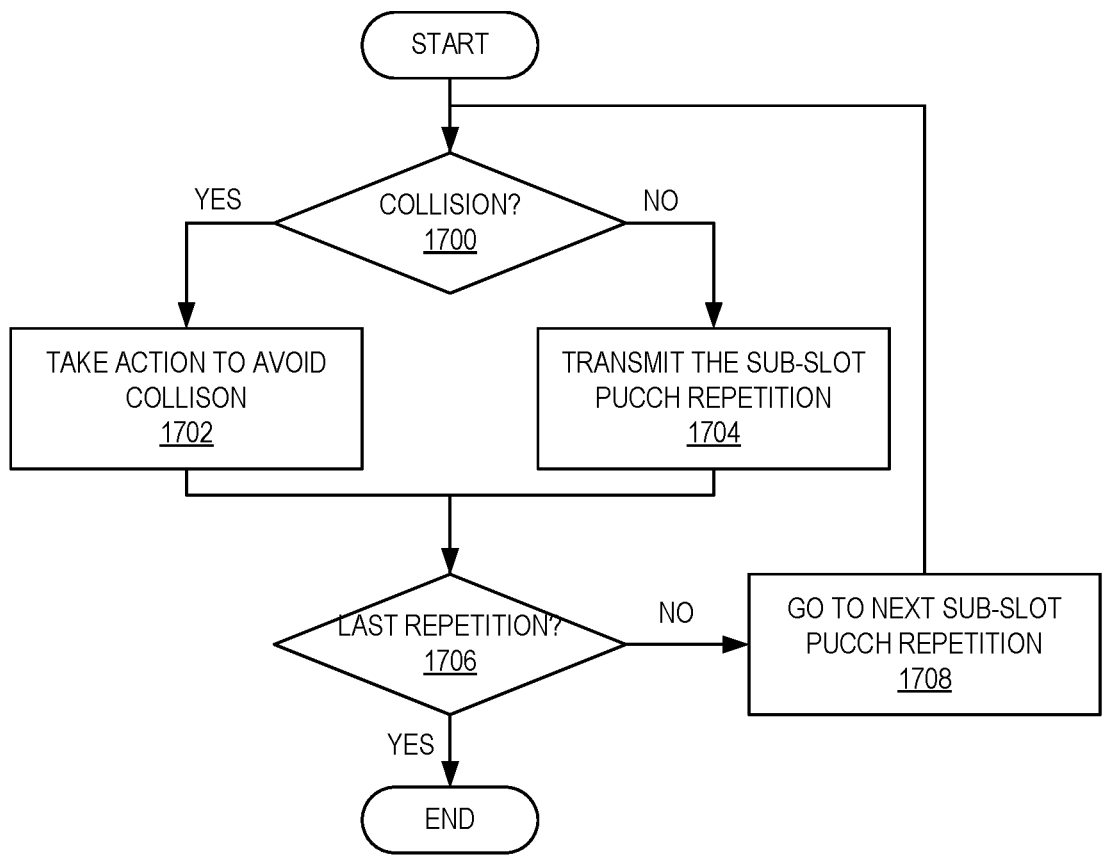
FIG. 17 is a flow chart that illustrates the operation of a UE to transmit slot-based PUCCH repetitions with collision avoidance in accordance with one embodiment of the present disclosure.

FIG. 17 is a flow chart that illustrates the operation of the UE 412 to transmit slot-based PUCCH repetitions with collision avoidance in accordance with one example of the embodiments descried above. Optional steps are represented by dashed lines/boxes. As illustrated, the UE 4112 determines whether there is a collision for the first slot-based PUCCH repetition as described above (step 1700). If so, the UE 412 takes one or more actions to avoid the collision, as described above (1702). For example, in some embodiments, the UE 412 does not transmit this slot-based repetition. As another example, in some embodiments, the UE 412 does not transmit this slot-based repetition and this slot-based repetition is still counted towards the number of repetitions/sub-slots to be transmitted. As another example, in some embodiments, the UE 412 does not transmit this slot-based repetition and this slot-based repetition is not counted towards the number of repetitions/sub-slots to be transmitted.

Returning to step 1700, if there is no collision, the UE 412 transmits the slot-based PUCCH repetition (step 1704). Then, whether proceeding from step 1702 or 1704, the UE 412 determines whether this is the last slot-based PUCCH repetition (step 1706). If not, the process proceeds to the next slot-based PUCCH repetition (step 1708) and then returns to step 1700 and repeated. Once the last repetition is reached, the process ends.

II. Sub-Slot PUCCH Crossing the Slot Boundary

To increase coverage of sub-slot PUCCH, another approach is to allow PUCCH transmission to cross the sub-slot boundary. However, the end of the last sub-slot in a slot corresponds to the slot boundary which might need to be handled differently. In the following, possible solutions to handle PUCCH transmission crossing the sub-slot and/or slot boundary are provided.

In one non-limiting embodiment, the PUCCH transmission is allowed to cross sub-slot boundary but not the slot boundary. If PUCCH resource to be transmitted in the last sub-slot of a slot would cross the slot boundary, the PUCCH resource is truncated to be within the slot boundary. See FIG. 18. In particular, FIG. 18 shows an example of truncation of PUCCH resource which crosses the slot boundary.

In one non-limiting embodiment, the PUCCH transmission is allowed to cross sub-slot boundary including the slot boundary. If PUCCH resource in the last sub-slot of a slot would cross the slot boundary, the PUCCH resource is segmented into two PUCCH resources, one ending at the slot boundary and another starting right after the slot boundary. See FIG. 19. In particular, FIG. 19 shows an example of PUCCH segmentation for PUCCH transmission which crosses the slot boundary.

In one version of the above embodiment, the segmentation is performed only if the resulting PUCCHs after segmentation have PUCCH lengths larger than or equal to 4 symbols. The PUCCH format for each segment remains the same as the initially indicated PUCCH.

For the segmentation case above, in case of sub-slot PUCCH repetition, the actual number of PUCCH repetitions can be different from the indicated/configured number (may referred to as a nominal number). For example, segmentation of a PUCCH transmission which crosses the slot boundary can result in two actual PUCCH transmissions.

Figure 20:
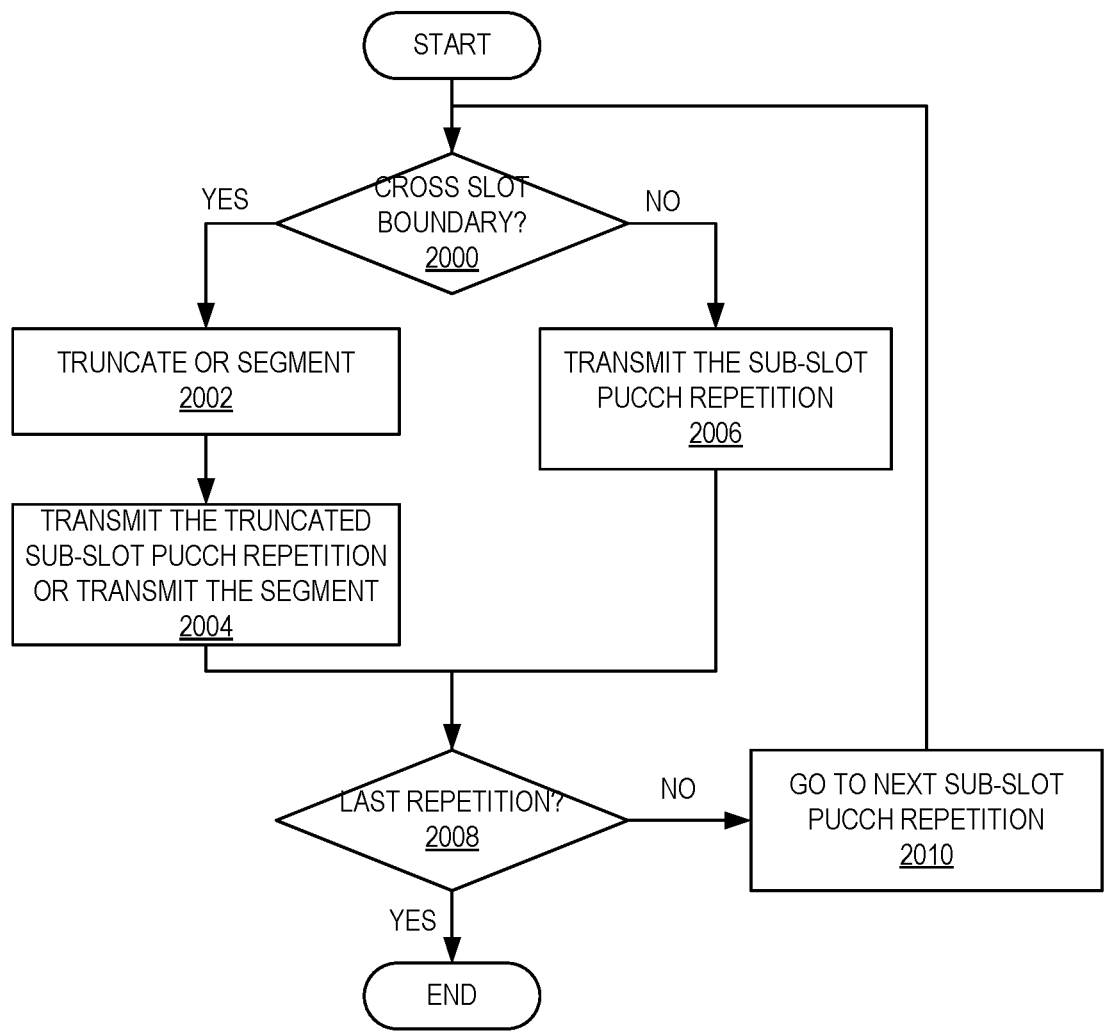
FIG. 20 is a flow chart that illustrates the operation of the UE to transmit slot-based PUCCH repetitions taking into consideration slot-boundary crossings in accordance with one embodiment of the present disclosure.

FIG. 20 is a flow chart that illustrates the operation of the UE 412 to transmit slot-based PUCCH repetitions taking into consideration slot-boundary crossings in accordance with one example of the embodiments descried above. Optional steps are represented by dashed lines/boxes. As illustrated, the UE 4112 determines whether the first slot-based PUCCH repetition crosses a slot boundary (step 2000). If so, the UE 412 either truncates the slot-based PUCCH repetition to fit within the slot boundary or segments the slot-based PUCCH repetition into two segments—one before the slot boundary and one after the slot boundary, as described above (step 2002). The UE 412 then transmits the truncated repetition or the segmented repetition (step 2004). Returning to step 2000, if the repetition does not cross a slot boundary, the UE 412 transmits the slot-based PUCCH repetition (step 2006). Then, whether proceeding from step 2004 or 2006, the UE 412 determines whether this is the last slot-based PUCCH repetition (step 2008). If not, the process proceeds to the next slot-based PUCCH repetition (step 2010) and then returns to step 2000 and repeated. Once the last repetition is reached, the process ends.

III. Repetition by Priority Indication

A dynamic or semi-static priority indication associated to a PUCCH transmission can be used to enable or disable repetition. In the following, different levels of priorities can be indicated by bit-map or RRC configuration.

In one example, a repetition factor, e.g. K, is configured by higher layers. If a PUCCH transmission is configured with high priority (e.g., in case of transmission of SR or CSI in a PUCCH), or if it is indicated by DCI as high priority (e.g., in case of HARQ-ACK transmission in a PUCCH), the transmission of corresponding PUCCH would be repeated K times. Otherwise, K=1 is assumed for the corresponding PUCCH transmission. In another example, a low priority indication (dynamically or semi-statically) can indicate K repetition.

In another example, multiple repetition factors are configured by higher layer where each repetition factor is associated with a priority level. For example, a UE can be configured with repetition factor n1 and n2 where n1 and n2 correspond to tow level or priorities, for example high and low, respectively. For example, if a PUCCH transmission is configured with high priority (e.g., in case of transmission of SR or CSI in a PUCCH), or if it is indicated by DCI as high priority (e.g., in case of HARQ-ACK transmission in a PUCCH), the transmission of corresponding PUCCH would be repeated K=n2 times. Otherwise, K=n1 repetition is assumed for the corresponding PUCCH transmission. In another example, a low priority indication (dynamically or semi-statically) can indicate K=n2 repetitions and high priority indication can indicate K=n1.

In another non-limiting example, a group of high (or low) PUCCH priorities can indicate a repetition factor and another group of high (or low) PUCCH priorities can indicate another repetition factor.

In another example, the priority of PUCCH transmission for determining number of repetitions can be implicit, for example based on UCI type with UCI type priority of HARQ-ACK>SR>CSI with higher priority>CSI with lower priority.

For a PUCCH repetition with a repetition factor K, the repetition could be in K consecutive slots/sub-slots. In another non-limiting example, the repetition could be in K back-2-back PUCCH transmission in a set of consecutive slots/sub-slots.

If the corresponding PUCCH transmission is not possible in a slot/sub-slot, that slot/sub-slot is counted for repetition similarly to PUSCH slot-aggregation in Rel-15.

In another example, if the corresponding PUCCH transmission is not possible in a slot/sub-slot, that slot/sub-slot is not counted for repetition similarly to PUCCH slot-aggregation in Rel-15.

Figure 21:
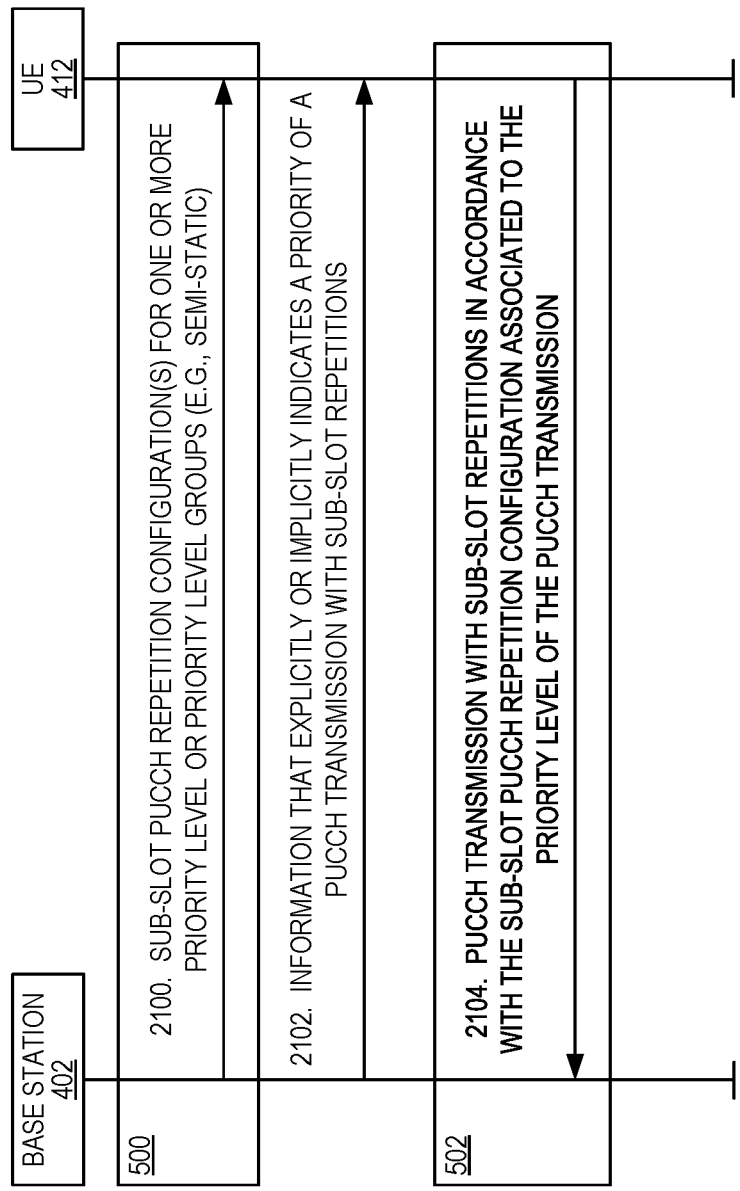
FIG. 21 illustrates the operation of a base station and a UE to provide slot-based PUCCH repetitions with priority indication in accordance with some embodiments of the present disclosure.

FIG. 21 illustrates the operation of a base station 402 and a UE 412 to provide slot-based PUCCH repetitions with priority indication in accordance with some embodiments of the present disclosure. As illustrated, the base station 402 provides a number sub-slot PUCCH repetition configurations to the UE 412 for one or more priority levels or one or more groups of priority levels, as descried above (step 2100). As described above, the sub-slot PUCCH repetition configurations may be semi-static configurations, but are not limited thereto. The sub-slot PUCCH repetition configuration may include, for example, information that indicates a number of repetitions for the sub-slot PUCCH repetition configuration and/or a number of sub-slots for the sub-slot PUCCH repetition configuration. However, further details are provided above. The base station 402 also provides information to the UE 412 that explicitly or implicitly indicates a priority level of a PUCCH transmission with sub-slot repetitions (step 2102). This information may take various forms, as described above. The UE 412 then transmits a PUCCH transmission with sub-slot repetitions in accordance with the sub-slot PUCCH repetition configuration associated to the indicated priority level (step 2104).

IV. Additional Aspects Relevant to all Embodiments and Solutions

Figure 22:
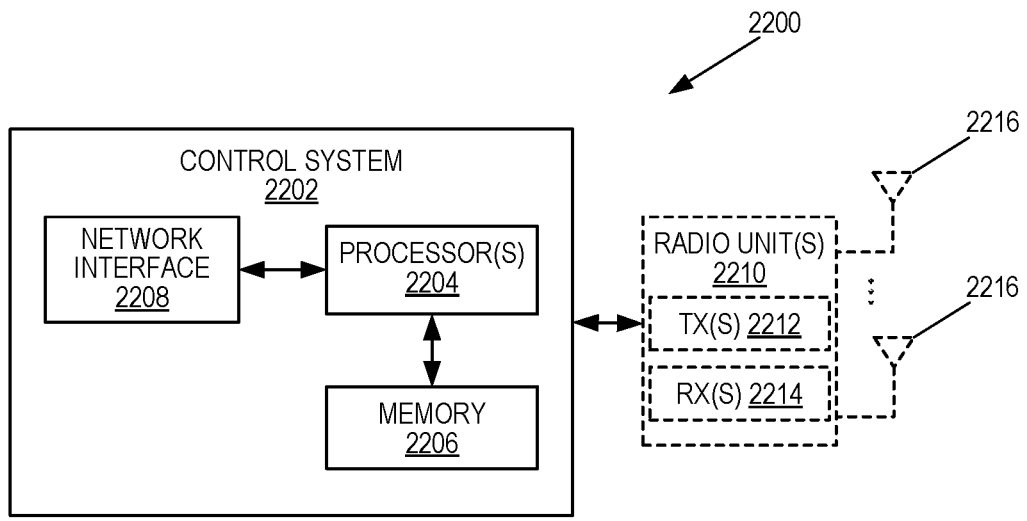
FIGS. 22 through 24 are schematic block diagrams of example embodiments of a network node.

FIG. 22 is a schematic block diagram of a radio access node 2200 according to some embodiments of the present disclosure. Optional features are represented by dashed boxes. The radio access node 2200 may be, for example, a base station 402 or 406 or a network node that implements all or part of the functionality of the base station 402 or gNB described herein. As illustrated, the radio access node 2200 includes a control system 2202 that includes one or more processors 2204 (e.g., Central Processing Units (CPUs), Application Specific Integrated Circuits (ASICs), Field Programmable Gate Arrays (FPGAs), and/or the like), memory 2206, and a network interface 2208. The one or more processors 2204 are also referred to herein as processing circuitry. In addition, the radio access node 2200 may include one or more radio units 2210 that each includes one or more transmitters 2212 and one or more receivers 2214 coupled to one or more antennas 2216. The radio units 2210 may be referred to or be part of radio interface circuitry. In some embodiments, the radio unit(s) 2210 is external to the control system 2202 and connected to the control system 2202 via, e.g., a wired connection (e.g., an optical cable). However, in some other embodiments, the radio unit(s) 2210 and potentially the antenna(s) 2216 are integrated together with the control system 2202. The one or more processors 2204 operate to provide one or more functions of a radio access node 2200 as described herein (e.g., one or more functions of the base station 402 described above). In some embodiments, the function(s) are implemented in software that is stored, e.g., in the memory 2206 and executed by the one or more processors 2204.

Figure 23:
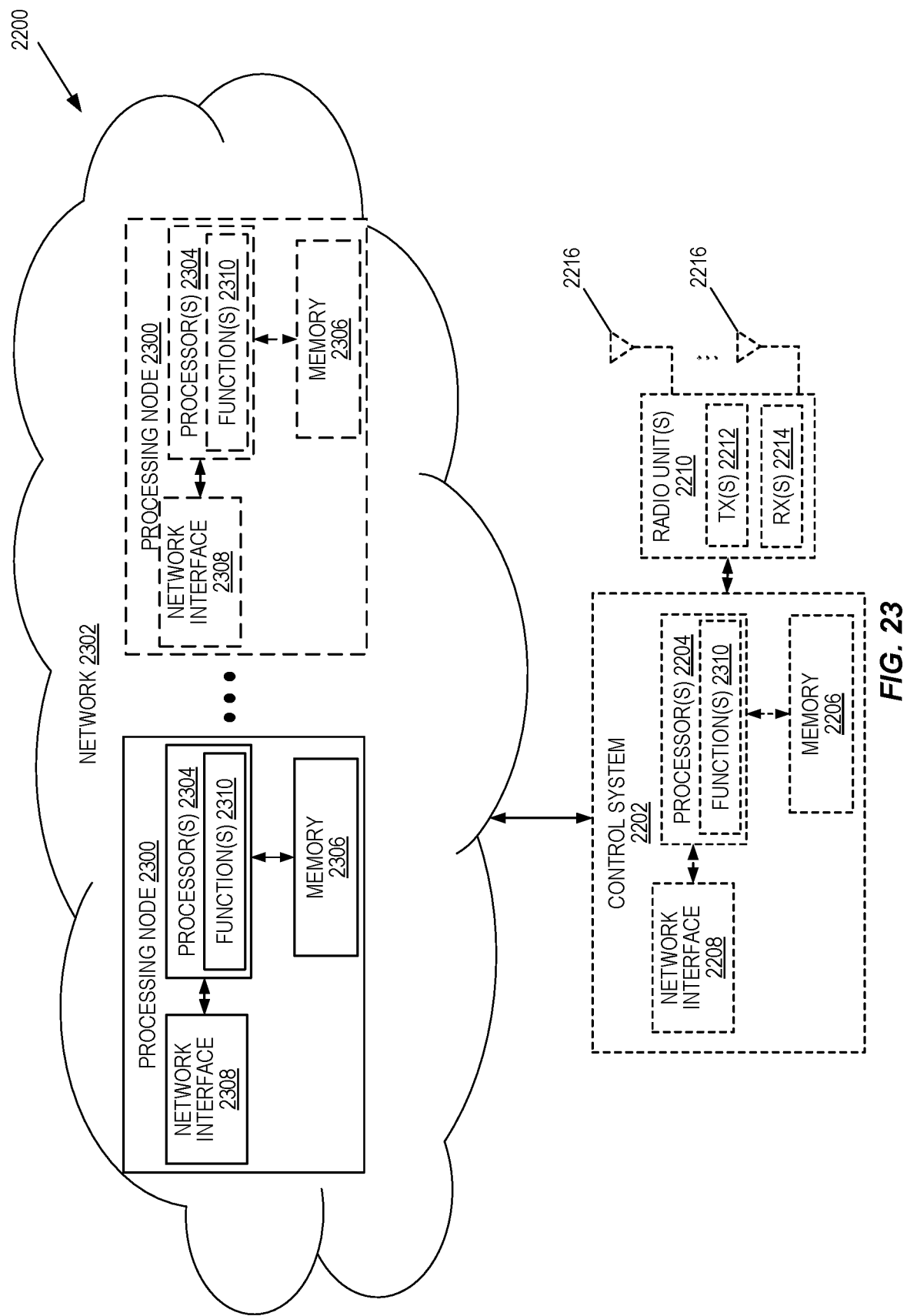

FIG. 23 is a schematic block diagram that illustrates a virtualized embodiment of the radio access node 2200 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 2200 in which at least a portion of the functionality of the radio access node 2200 is implemented as a virtual component(s) (e.g., via a virtual machine(s) executing on a physical processing node(s) in a network(s)). As illustrated, in this example, the radio access node 2200 may include the control system 2202 and/or the one or more radio units 2210, as described above. The control system 2202 may be connected to the radio unit(s) 2210 via, for example, an optical cable or the like. The radio access node 2200 includes one or more processing nodes 2300 coupled to or included as part of a network(s) 2302. If present, the control system 2202 or the radio unit(s) are connected to the processing node(s) 2300 via the network 2302. Each processing node 2300 includes one or more processors 2304 (e.g., CPUs, ASICs, FPGAs, and/or the like), memory 2306, and a network interface 2308.

In this example, functions 2310 of the radio access node 2200 described herein (e.g., one or more functions of the base station 402 described above) are implemented at the one or more processing nodes 2300 or distributed across the one or more processing nodes 2300 and the control system 2202 and/or the radio unit(s) 2210 in any desired manner. In some particular embodiments, some or all of the functions 2310 of the radio access node 2200 described herein are implemented as virtual components executed by one or more virtual machines implemented in a virtual environment(s) hosted by the processing node(s) 2300. As will be appreciated by one of ordinary skill in the art, additional signaling or communication between the processing node(s) 2300 and the control system 2202 is used in order to carry out at least some of the desired functions 2310. Notably, in some embodiments, the control system 2202 may not be included, in which case the radio unit(s) 2210 communicate directly with the processing node(s) 2300 via an appropriate network interface(s).

In some embodiments, a computer program including instructions which, when executed by at least one processor, causes the at least one processor to carry out the functionality of radio access node 2200 or a node (e.g., a processing node 2300) implementing one or more of the functions 2310 of the radio access node 2200 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 24:
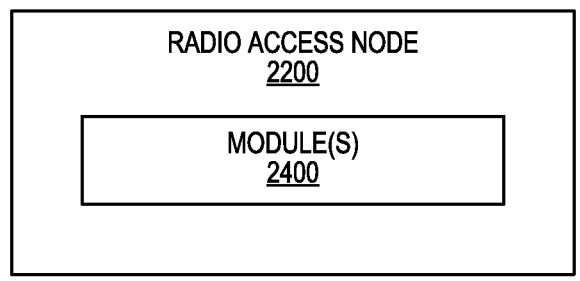

FIG. 24 is a schematic block diagram of the radio access node 2200 according to some other embodiments of the present disclosure. The radio access node 2200 includes one or more modules 2400, each of which is implemented in software. The module(s) 2400 provide the functionality of the radio access node 2200 described herein (e.g., one or more functions of the base station 402 described above). This discussion is equally applicable to the processing node 2300 of FIG. 23 where the modules 2400 may be implemented at one of the processing nodes 2300 or distributed across multiple processing nodes 2300 and/or distributed across the processing node(s) 2300 and the control system 2202.

Figure 25:
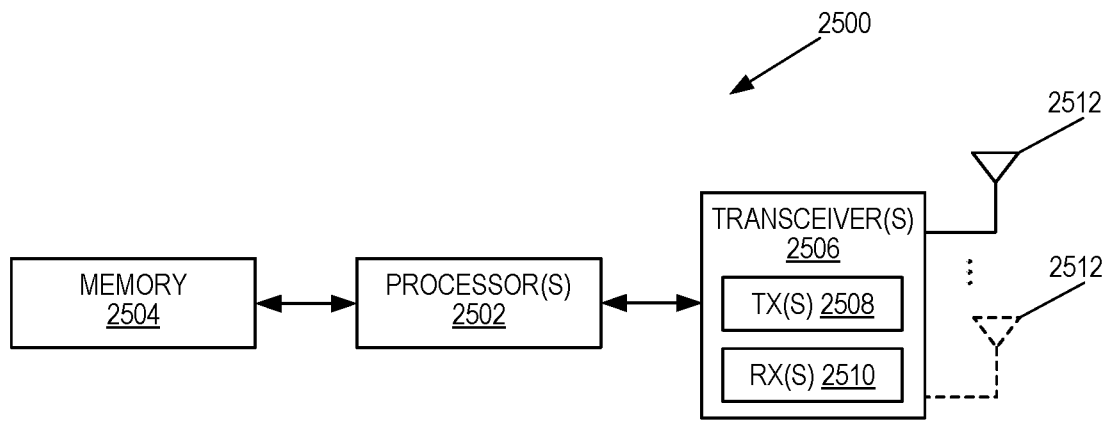
FIGS. 25 and 26 are schematic block diagrams of example embodiments of a wireless device.

FIG. 25 is a schematic block diagram of a wireless communication device 2500 according to some embodiments of the present disclosure. The wireless communication device 2500 may be the UE 412 described above. As illustrated, the wireless communication device 2500 includes one or more processors 2502 (e.g., CPUs, ASICs, FPGAs, and/or the like), memory 2504, and one or more transceivers 2506 each including one or more transmitters 2508 and one or more receivers 2510 coupled to one or more antennas 2512. The transceiver(s) 2506 includes radio-front end circuitry connected to the antenna(s) 2512 that is configured to condition signals communicated between the antenna(s) 2512 and the processor(s) 2502, as will be appreciated by on of ordinary skill in the art. The processors 2502 are also referred to herein as processing circuitry. The transceivers 2506 are also referred to herein as radio circuitry. In some embodiments, the functionality of the wireless communication device 2500 described above (e.g., one or more functions of the UE 412 described above) may be fully or partially implemented in software that is, e.g., stored in the memory 2504 and executed by the processor(s) 2502. Note that the wireless communication device 2500 may include additional components not illustrated in FIG. 25 such as, e.g., one or more user interface components (e.g., an input/output interface including a display, buttons, a touch screen, a microphone, a speaker(s), and/or the like and/or any other components for allowing input of information into the wireless communication device 2500 and/or allowing output of information from the wireless communication device 2500), a power supply (e.g., a battery and associated power circuitry), etc.

In some embodiments, a computer program including instructions which, when executed by at least one processor, causes the at least one processor to carry out the functionality of the wireless communication device 2500 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 26:
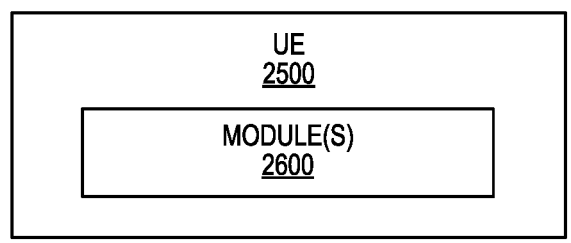

FIG. 26 is a schematic block diagram of the wireless communication device 2500 according to some other embodiments of the present disclosure. The wireless communication device 2500 includes one or more modules 2600, each of which is implemented in software. The module(s) 2600 provide the functionality of the wireless communication device 2500 described herein (e.g., one or more functions of the UE 412 described above).

Figure 27:
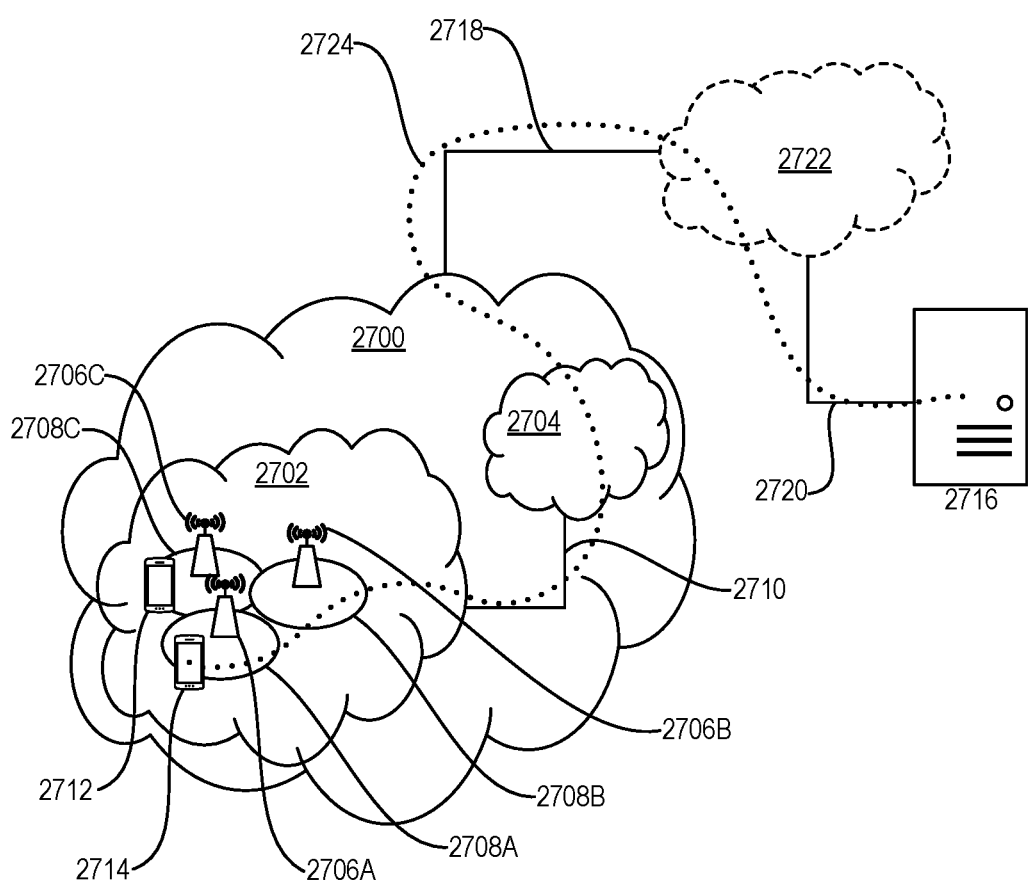
FIG. 27 illustrates an example embodiment of a communication system in which embodiments of the present disclosure may be implemented.

With reference to FIG. 27, in accordance with an embodiment, a communication system includes a telecommunication network 2700, such as a 3GPP-type cellular network, which comprises an access network 2702, such as a RAN, and a core network 2704. The access network 2702 comprises a plurality of base stations 2706A, 2706B, 2706C, such as Node Bs, eNBs, gNBs, or other types of wireless Access Points (APs), each defining a corresponding coverage area 2708A, 2708B, 2708C. Each base station 2706A, 2706B, 2706C is connectable to the core network 2704 over a wired or wireless connection 2710. A first UE 2712 located in coverage area 2708C is configured to wirelessly connect to, or be paged by, the corresponding base station 2706C. A second UE 2714 in coverage area 2708A is wirelessly connectable to the corresponding base station 2706A. While a plurality of UEs 2712, 2714 are illustrated in this example, the disclosed embodiments are equally applicable to a situation where a sole UE is in the coverage area or where a sole UE is connecting to the corresponding base station 2706.

The telecommunication network 2700 is itself connected to a host computer 2716, which may be embodied in the hardware and/or software of a standalone server, a cloud-implemented server, a distributed server, or as processing resources in a server farm. The host computer 2716 may be under the ownership or control of a service provider, or may be operated by the service provider or on behalf of the service provider. Connections 2718 and 2720 between the telecommunication network 2700 and the host computer 2716 may extend directly from the core network 2704 to the host computer 2716 or may go via an optional intermediate network 2722. The intermediate network 2722 may be one of, or a combination of more than one of, a public, private, or hosted network; the intermediate network 2722, if any, may be a backbone network or the Internet; in particular, the intermediate network 2722 may comprise two or more sub-networks (not shown).

The communication system of FIG. 27 as a whole enables connectivity between the connected UEs 2712, 2714 and the host computer 2716. The connectivity may be described as an Over-the-Top (OTT) connection 2724. The host computer 2716 and the connected UEs 2712, 2714 are configured to communicate data and/or signaling via the OTT connection 2724, using the access network 2702, the core network 2704, any intermediate network 2722, and possible further infrastructure (not shown) as intermediaries. The OTT connection 2724 may be transparent in the sense that the participating communication devices through which the OTT connection 2724 passes are unaware of routing of uplink and downlink communications. For example, the base station 2706 may not or need not be informed about the past routing of an incoming downlink communication with data originating from the host computer 2716 to be forwarded (e.g., handed over) to a connected UE 2712. Similarly, the base station 2706 need not be aware of the future routing of an outgoing uplink communication originating from the UE 2712 towards the host computer 2716.

Example implementations, in accordance with an embodiment, of the UE, base station, and host computer discussed in the preceding paragraphs will now be described with reference to FIG. 28. In a communication system 2800, a host computer 2802 comprises hardware 2804 including a communication interface 2806 configured to set up and maintain a wired or wireless connection with an interface of a different communication device of the communication system 2800. The host computer 2802 further comprises processing circuitry 2808, which may have storage and/or processing capabilities. In particular, the processing circuitry 2808 may comprise one or more programmable processors, ASICs, FPGAs, or combinations of these (not shown) adapted to execute instructions. The host computer 2802 further comprises software 2810, which is stored in or accessible by the host computer 2802 and executable by the processing circuitry 2808. The software 2810 includes a host application 2812. The host application 2812 may be operable to provide a service to a remote user, such as a UE 2814 connecting via an OTT connection 2816 terminating at the UE 2814 and the host computer 2802. In providing the service to the remote user, the host application 2812 may provide user data which is transmitted using the OTT connection 2816.

The communication system 2800 further includes a base station 2818 provided in a telecommunication system and comprising hardware 2820 enabling it to communicate with the host computer 2802 and with the UE 2814. The hardware 2820 may include a communication interface 2822 for setting up and maintaining a wired or wireless connection with an interface of a different communication device of the communication system 2800, as well as a radio interface 2824 for setting up and maintaining at least a wireless connection 2826 with the UE 2814 located in a coverage area (not shown in FIG. 28) served by the base station 2818. The communication interface 2822 may be configured to facilitate a connection 2828 to the host computer 2802. The connection 2828 may be direct or it may pass through a core network (not shown in FIG. 28) of the telecommunication system and/or through one or more intermediate networks outside the telecommunication system. In the embodiment shown, the hardware 2820 of the base station 2818 further includes processing circuitry 2830, which may comprise one or more programmable processors, ASICs, FPGAs, or combinations of these (not shown) adapted to execute instructions. The base station 2818 further has software 2832 stored internally or accessible via an external connection.

The communication system 2800 further includes the UE 2814 already referred to. The UE's 2814 hardware 2834 may include a radio interface 2836 configured to set up and maintain a wireless connection 2826 with a base station serving a coverage area in which the UE 2814 is currently located. The hardware 2834 of the UE 2814 further includes processing circuitry 2838, which may comprise one or more programmable processors, ASICs, FPGAs, or combinations of these (not shown) adapted to execute instructions. The UE 2814 further comprises software 2840, which is stored in or accessible by the UE 2814 and executable by the processing circuitry 2838. The software 2840 includes a client application 2842. The client application 2842 may be operable to provide a service to a human or non-human user via the UE 2814, with the support of the host computer 2802. In the host computer 2802, the executing host application 2812 may communicate with the executing client application 2842 via the OTT connection 2816 terminating at the UE 2814 and the host computer 2802. In providing the service to the user, the client application 2842 may receive request data from the host application 2812 and provide user data in response to the request data. The OTT connection 2816 may transfer both the request data and the user data. The client application 2842 may interact with the user to generate the user data that it provides.

Figure 28:
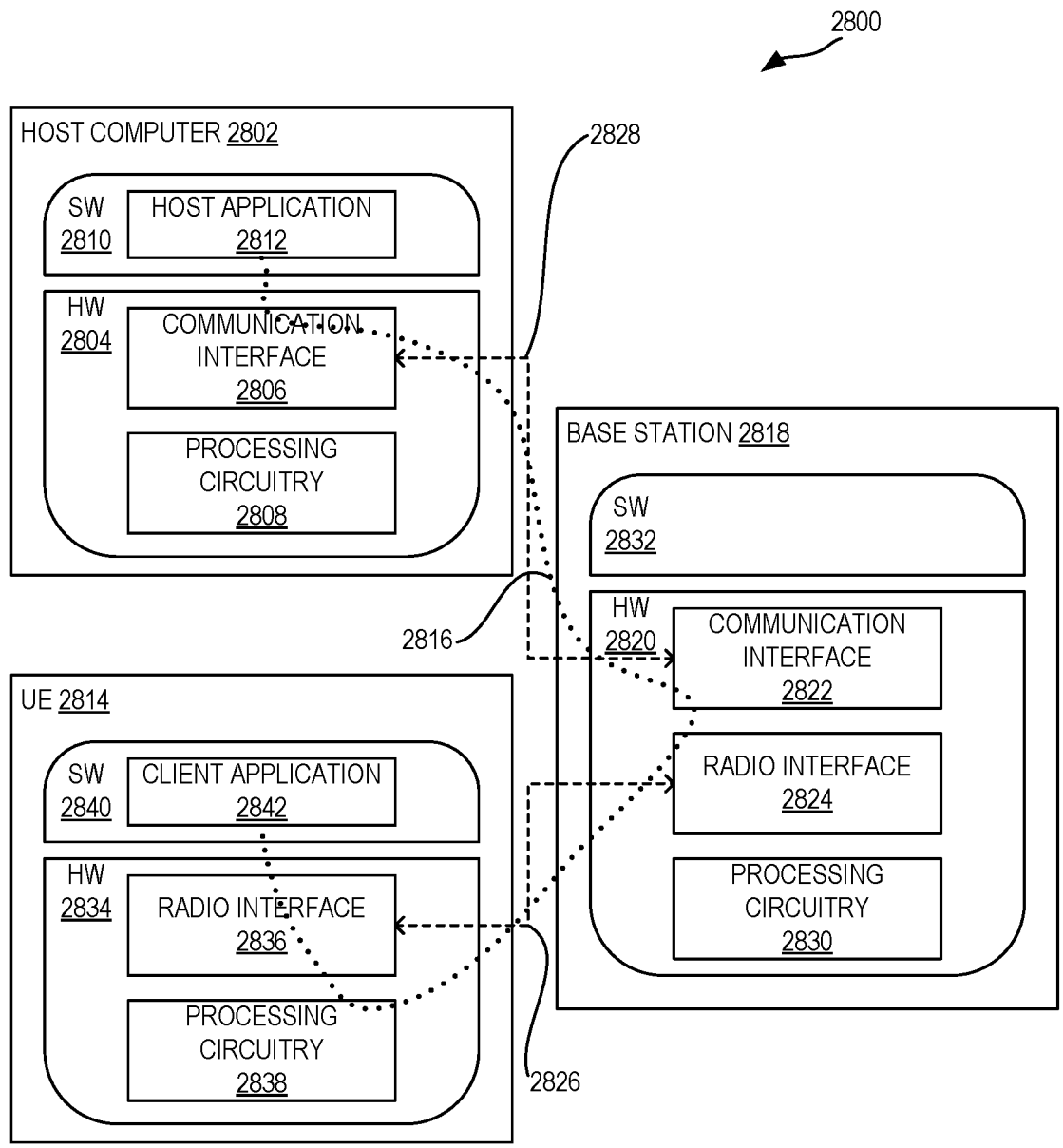
FIG. 28 illustrates example embodiments of the host computer, base station, and UE of FIG. 27.

It is noted that the host computer 2802, the base station 2818, and the UE 2814 illustrated in FIG. 28 may be similar or identical to the host computer 2716, one of the base stations 2706A, 2706B, 2706C, and one of the UEs 2712, 2714 of FIG. 27, respectively. This is to say, the inner workings of these entities may be as shown in FIG. 28 and independently, the surrounding network topology may be that of FIG. 27.

In FIG. 28, the OTT connection 2816 has been drawn abstractly to illustrate the communication between the host computer 2802 and the UE 2814 via the base station 2818 without explicit reference to any intermediary devices and the precise routing of messages via these devices. The network infrastructure may determine the routing, which may be configured to hide from the UE 2814 or from the service provider operating the host computer 2802, or both. While the OTT connection 2816 is active, the network infrastructure may further take decisions by which it dynamically changes the routing (e.g., on the basis of load balancing consideration or reconfiguration of the network).

The wireless connection 2826 between the UE 2814 and the base station 2818 is in accordance with the teachings of the embodiments described throughout this disclosure. One or more of the various embodiments improve the performance of OTT services provided to the UE 2814 using the OTT connection 2816, in which the wireless connection 2826 forms the last segment.

A measurement procedure may be provided for the purpose of monitoring data rate, latency, and other factors on which the one or more embodiments improve. There may further be an optional network functionality for reconfiguring the OTT connection 2816 between the host computer 2802 and the UE 2814, in response to variations in the measurement results. The measurement procedure and/or the network functionality for reconfiguring the OTT connection 2816 may be implemented in the software 2810 and the hardware 2804 of the host computer 2802 or in the software 2840 and the hardware 2834 of the UE 2814, or both. In some embodiments, sensors (not shown) may be deployed in or in association with communication devices through which the OTT connection 2816 passes; the sensors may participate in the measurement procedure by supplying values of the monitored quantities exemplified above, or supplying values of other physical quantities from which the software 2810, 2840 may compute or estimate the monitored quantities. The reconfiguring of the OTT connection 2816 may include message format, retransmission settings, preferred routing, etc.; the reconfiguring need not affect the base station 2818, and it may be unknown or imperceptible to the base station 2818. Such procedures and functionalities may be known and practiced in the art. In certain embodiments, measurements may involve proprietary UE signaling facilitating the host computer 2802's measurements of throughput, propagation times, latency, and the like. The measurements may be implemented in that the software 2810 and 2840 causes messages to be transmitted, in particular empty or 'dummy' messages, using the OTT connection 2816 while it monitors propagation times, errors, etc.

Figures 29, 30:
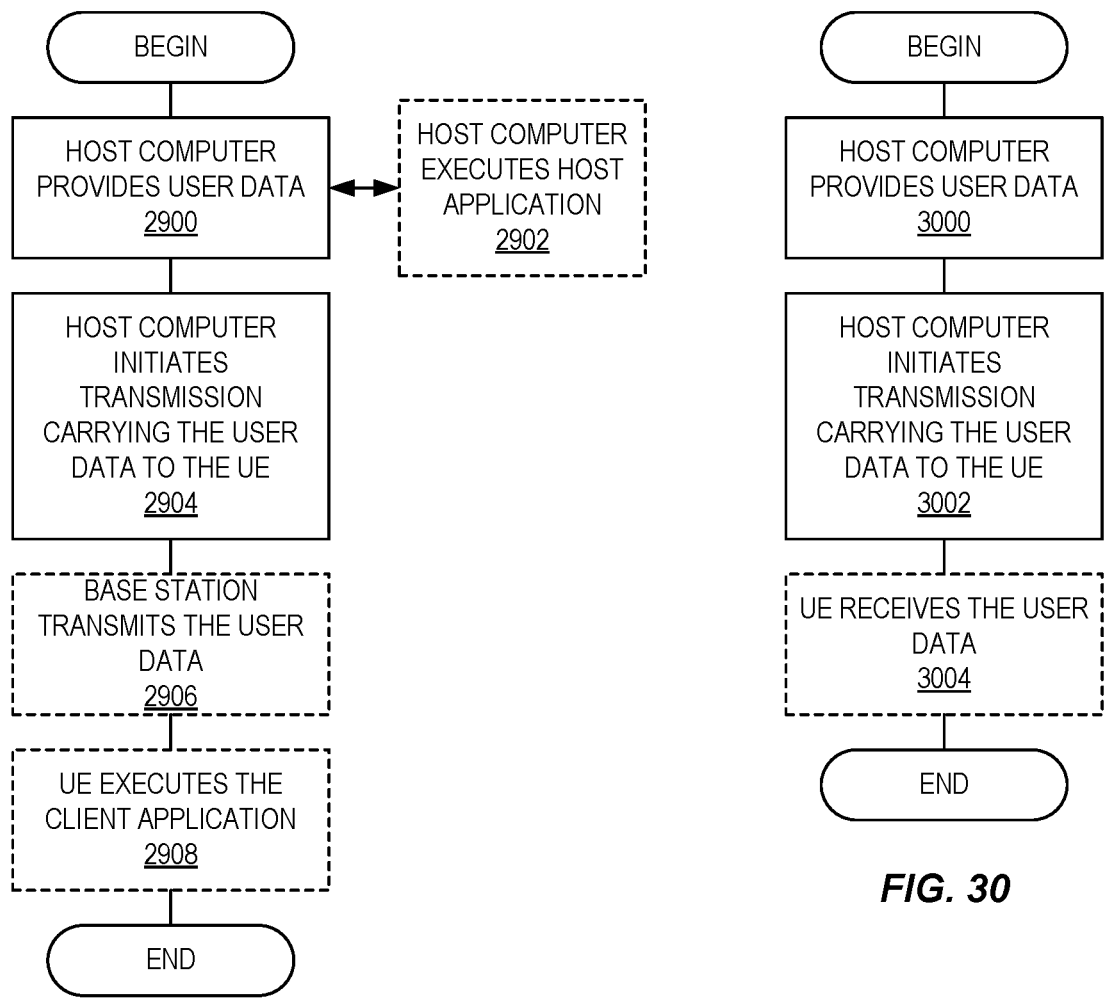

FIG. 29 is a flowchart illustrating a method implemented in a communication system, in accordance with one embodiment. The communication system includes a host computer, a base station, and a UE which may be those described with reference to FIGS. 27 and 28. For simplicity of the present disclosure, only drawing references to FIG. 29 will be included in this section. In step 2900, the host computer provides user data. In sub-step 2902 (which may be optional) of step 2900, the host computer provides the user data by executing a host application. In step 2904, the host computer initiates a transmission carrying the user data to the UE. In step 2906 (which may be optional), the base station transmits to the UE the user data which was carried in the transmission that the host computer initiated, in accordance with the teachings of the embodiments described throughout this disclosure. In step 2908 (which may also be optional), the UE executes a client application associated with the host application executed by the host computer.

FIG. 30 is a flowchart illustrating a method implemented in a communication system, in accordance with one embodiment. The communication system includes a host computer, a base station, and a UE which may be those described with reference to FIGS. 27 and 28. For simplicity of the present disclosure, only drawing references to FIG. 30 will be included in this section. In step 3000 of the method, the host computer provides user data. In an optional sub-step (not shown) the host computer provides the user data by executing a host application. In step 3002, the host computer initiates a transmission carrying the user data to the UE. The transmission may pass via the base station, in accordance with the teachings of the embodiments described throughout this disclosure. In step 3004 (which may be optional), the UE receives the user data carried in the transmission.

FIG. 31 is a flowchart illustrating a method implemented in a communication system, in accordance with one embodiment. The communication system includes a host computer, a base station, and a UE which may be those described with reference to FIGS. 27 and 28. For simplicity of the present disclosure, only drawing references to FIG. 31 will be included in this section. In step 3100 (which may be optional), the UE receives input data provided by the host computer. Additionally or alternatively, in step 3102, the UE provides user data. In sub-step 3104 (which may be optional) of step 3100, the UE provides the user data by executing a client application. In sub-step 3106 (which may be optional) of step 3102, the UE executes a client application which provides the user data in reaction to the received input data provided by the host computer. In providing the user data, the executed client application may further consider user input received from the user. Regardless of the specific manner in which the user data was provided, the UE initiates, in sub-step 3108 (which may be optional), transmission of the user data to the host computer. In step 3110 of the method, the host computer receives the user data transmitted from the UE, in accordance with the teachings of the embodiments described throughout this disclosure.

FIG. 32 is a flowchart illustrating a method implemented in a communication system, in accordance with one embodiment. The communication system includes a host computer, a base station, and a UE which may be those described with reference to FIGS. 27 and 28. For simplicity of the present disclosure, only drawing references to FIG. 32 will be included in this section. In step 3200 (which may be optional), in accordance with the teachings of the embodiments described throughout this disclosure, the base station receives user data from the UE. In step 3202 (which may be optional), the base station initiates transmission of the received user data to the host computer. In step 3204 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Group A Embodiments

Embodiment 1: A method performed by a wireless communication device (412) for sub-slot Physical Uplink Control Channel, PUCCH, repetitions, the method comprising: receiving (500) one or more sub-slot PUCCH repetition configurations from a base station (402); and transmitting (502) two or more sub-slot PUCCH repetitions in accordance with one of the one or more sub-slot PUCCH repetition configurations.

Embodiment 2: The method of embodiment 1 wherein receiving (500) the one or more sub-slot PUCCH repetition configurations comprises receiving (600) one or more semi-static sub-slot PUCCH repetition configurations.

Embodiment 3: The method of embodiment 2 wherein the one or more semi-static sub-slot PUCCH repetition configurations are associated to one or more PUCCH formats, respectively.

Embodiment 4: The method of embodiment 3 further comprising: receiving (602) downlink control information that schedules a Physical Downlink Shared Channel, PDSCH, transmission to the wireless communication device (412) and includes an indication of a particular PUCCH format for the two or more sub-slot PUCCH repetitions, the particular PUCCH format being one of the one or more PUCCH formats; wherein transmitting (502) the two or more sub-slot PUCCH repetitions comprises transmitting (502) the two or more sub-slot PUCCH repetitions in accordance with a respective one of the one or more semi-static sub-slot PUCCH repetition configurations that is associated to the particular PUCCH format.

Embodiment 4A: The method of embodiment 2 wherein the one or more semi-static sub-slot PUCCH repetition configurations are associated to one or more PUCCH resources, respectively.

Embodiment 4B: The method of embodiment 4A further comprising: receiving downlink control information that schedules a Physical Downlink Shared Channel, PDSCH, transmission to the wireless communication device (412) and includes an indication of a particular PUCCH resource for the two or more sub-slot PUCCH repetitions, the particular PUCCH resource being one of the one or more PUCCH resources; wherein transmitting the two or more sub-slot PUCCH repetitions comprises transmitting the two or more sub-slot PUCCH repetitions in accordance with a respective one of the one or more semi-static sub-slot PUCCH repetition configurations that is associated to the particular PUCCH resource.

Embodiment 5: The method of embodiment 1 wherein receiving (500) the one or more sub-slot PUCCH repetition configurations comprises receiving (802) a dynamic sub-slot PUCCH repetition configuration for the PUCCH transmission with sub-slot repetitions.

Embodiment 6: The method of embodiment 5 wherein receiving (802) the dynamic sub-slot PUCCH repetition configuration comprises receiving (802) downlink control information that schedules a Physical Downlink Shared Channel, PDSCH, transmission to the wireless communication device (412) and includes the dynamic sub-slot PUCCH repetition configuration or an indication of the dynamic sub-slot PUCCH repetition configuration.

Embodiment 7: The method of embodiment 5 or 6 wherein transmitting (502) the two or more sub-slot PUCCH repetitions comprises transmitting (502) the two or more sub-slot PUCCH repetitions in accordance with the dynamic sub-slot PUCCH repetition configuration.

Embodiment 8: The method of embodiment 4, 4B, or 6 wherein the downlink control information further comprises an indication for HARQ ACK timing (e.g., K1), and the indication for HARQ ACK timing is applied to a first sub-slot PUCCH repetition from among the two or more sub-slot PUCCH repetitions.

Embodiment 9: The method of embodiment 8 wherein subsequent sub-slot PUCCH repetitions from among the two or more sub-slot PUCCH repetitions occupy subsequent, consecutive available sub-slots.

Embodiment 10: The method of embodiment 4, 4B, or 6 wherein the dynamic configuration comprises two or more K1 values for the two or more sub-slot PUCCH repetitions, respectively.

Embodiment 11: The method of any one of embodiments 1 to 10 wherein each sub-slot PUCCH repetition from among the two or more sub-slot PUCCH repetitions use a same resource allocation in the time domain across two or more consecutive, available sub-slots.

Embodiment 12: The method of any one of embodiments 1 to 11 wherein at least one of the two or more sub-slot PUCCH repetitions is extended to reach a sub-slot boundary.

Embodiment 13: The method of any one of embodiments 1 to 12 wherein transmitting (502) the two or more sub-slot PUCCH repetitions comprises transmitting (502) the two or more sub-slot PUCCH repetitions using frequency hopping.

Embodiment 14: The method of embodiment 13 wherein the frequency hopping is inter-sub-slot frequency hopping, inter-slot frequency hopping, or intra-sub-slot frequency hopping.

Embodiment 15: The method of any one of embodiments 1 to 14 wherein transmitting (502) the two or more sub-slot PUCCH repetitions comprises, for a sub-slot PUCCH repetition from among the two or more sub-slot PUCCH repetitions: determining (1700; YES) that there is a collision for the sub-slot PUCCH repetition; and responsive to determining (1700; YES) that there is a collision for the sub-slot PUCCH repetition, taking (1702) one or more actions to avoid the collision.

Embodiment 16: The method of embodiment 15 wherein the one or more actions comprise refraining from transmitting the sub-slot PUCCH repetition.

Embodiment 17: The method of embodiment 16 wherein the sub-slot PUCCH repetition is counted toward a number of sub-slot PUCCH repetitions transmitted.

Embodiment 18: The method of embodiment 16 wherein the sub-slot PUCCH repetition is not counted toward a number of sub-slot PUCCH repetitions transmitted.

Embodiment 19: The method of any one of embodiments 1 to 18 wherein transmitting (502) the two or more sub-slot PUCCH repetitions comprises, for a sub-slot PUCCH repetition from among the two or more sub-slot PUCCH repetitions: determining (2000; YES) the sub-slot PUCCH repetition crosses a slot boundary; and responsive to determining (2000; YES) that the sub-slot PUCCH repetition crosses a slot boundary, truncating (2002) the sub-slot PUCCH repetition to fit within the slot boundary.

Embodiment 20: The method of any one of embodiments 1 to 18 wherein transmitting (502) the two or more sub-slot PUCCH repetitions comprises, for a sub-slot PUCCH repetition from among the two or more sub-slot PUCCH repetitions: determining (2000; YES) the sub-slot PUCCH repetition crosses a slot boundary; and responsive to determining (2000; YES) that the sub-slot PUCCH repetition crosses a slot boundary, segmenting (2002) the sub-slot PUCCH repetition into a first segment that ends at or prior to the slot boundary and a second segment that start at or after the slot boundary.

Embodiment 21: The method of any one of embodiments 1 to 20 wherein: the one or more sub-slot PUCCH repetition configurations comprise one or more sub-slot PUCCH repetition configurations associated to one or more priority levels or one or more groups of priority levels, respectively; the method further comprises receiving (2102) information that explicitly or implicitly indicates a priority level of the two or more sub-slot PUCCH repetitions; and transmitting (502) the two or more sub-slot PUCCH repetitions comprises transmitting (2104) the two or more sub-slot PUCCH repetitions in accordance with one of the one or more sub-slot PUCCH repetition configurations that is associated to the indicated priority level of the two or more sub-slot PUCCH repetitions or associated to a group of priority levels that includes the indicated priority level of the two or more sub-slot PUCCH repetitions.

Embodiment 22: The method of any one of embodiments 1 to 21 wherein the sub-slot PUCCH repetition configuration(s) comprise information that indicates a number of sub-slot PUCCH repetitions to be transmitted.

Embodiment 23: The method of any of the previous embodiments, further comprising: providing user data; and forwarding the user data to a host computer via a transmission to the base station.

Group B Embodiments

Embodiment 24: A method performed by a base station (402) for sub-slot Physical Uplink Control Channel, PUCCH, repetitions, the method comprising: providing (500), to a wireless communication device (412), one or more sub-slot PUCCH repetition configurations; and receiving (502), from the wireless communication device (412), a PUCCH transmission in accordance with one of the one or more sub-slot PUCCH repetition configurations.

Embodiment 25: The method of any of the previous embodiments, further comprising: obtaining user data; and forwarding the user data to a host computer or a wireless device.

Group C Embodiments

Embodiment 26: A wireless communication device for sub-slot Physical Uplink Control Channel, PUCCH, repetitions, the wireless communication device comprising: processing circuitry configured to perform any of the steps of any of the Group A embodiments; and power supply circuitry configured to supply power to the wireless communication device.

Embodiment 27: A base station for sub-slot Physical Uplink Control Channel, PUCCH, repetitions, the base station comprising: processing circuitry configured to perform any of the steps of any of the Group B embodiments; and power supply circuitry configured to supply power to the base station.

Embodiment 28: A User Equipment, UE, for sub-slot Physical Uplink Control Channel, PUCCH, repetitions, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 29: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 30: The communication system of the previous embodiment further including the base station.

Embodiment 31: The communication system of any of the previous 2 embodiments, further including the UE, wherein the UE is configured to communicate with the base station.

Embodiment 32: The communication system of any of the previous 3 embodiments, wherein: the processing circuitry of the host computer is configured to execute a host application, thereby providing the user data; and the UE comprises processing circuitry configured to execute a client application associated with the host application.

Embodiment 33: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 34: The method of the previous embodiment, further comprising, at the base station, transmitting the user data.

Embodiment 35: The method of any of the previous 2 embodiments, wherein the user data is provided at the host computer by executing a host application, the method further comprising, at the UE, executing a client application associated with the host application.

Embodiment 36: A User Equipment, UE, configured to communicate with a base station, the UE comprising a radio interface and processing circuitry configured to perform the method of any of the previous 3 embodiments.

Embodiment 37: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 38: The communication system of the previous embodiment, wherein the cellular network further includes a base station configured to communicate with the UE.

Embodiment 39: The communication system of any of the previous 2 embodiments, wherein: the processing circuitry of the host computer is configured to execute a host application, thereby providing the user data; and the UE's processing circuitry is configured to execute a client application associated with the host application.

Embodiment 40: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 41: The method of the previous embodiment, further comprising at the UE, receiving the user data from the base station.

Embodiment 42: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 43: The communication system of the previous embodiment, further including the UE.

Embodiment 44: The communication system of any of the previous 2 embodiments, further including the base station, wherein the base station comprises a radio interface configured to communicate with the UE and a communication interface configured to forward to the host computer the user data carried by a transmission from the UE to the base station.

Embodiment 45: The communication system of any of the previous 3 embodiments, wherein: the processing circuitry of the host computer is configured to execute a host application; and the UE's processing circuitry is configured to execute a client application associated with the host application, thereby providing the user data.

Embodiment 46: The communication system of any of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 47: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 48: The method of the previous embodiment, further comprising, at the UE, providing the user data to the base station.

Embodiment 49: The method of the previous 2 embodiments, further comprising: at the UE, executing a client application, thereby providing the user data to be transmitted; and at the host computer, executing a host application associated with the client application.

Embodiment 50: The method of any of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 51: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 52: The communication system of the previous embodiment further including the base station.

Embodiment 53: The communication system of any of the previous 2 embodiments, further including the UE, wherein the UE is configured to communicate with the base station.

Embodiment 54: The communication system of any of the previous 3 embodiments, wherein: the processing circuitry of the host computer is configured to execute a host application; and the UE is configured to execute a client application associated with the host application, thereby providing the user data to be received by the host computer.

Embodiment 55: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 56: The method of any of the previous embodiment, further comprising at the base station, receiving the user data from the UE.

Embodiment 57: The method of any of the previous 2 embodiments, further comprising at the base station, initiating a transmission of the received user data to the host computer.

Those skilled in the art will recognize improvements and modifications to the embodiments of the present disclosure. All such improvements and modifications are considered within the scope of the concepts disclosed herein.

The invention claimed is:

1. A method performed by a wireless communication device for sub-slot Physical Uplink Control Channel, PUCCH, repetitions, the method comprising:
   receiving one or more sub-slot PUCCH repetition configurations from a base station, wherein receiving the one or more sub-slot PUCCH repetition configurations comprises receiving a dynamic sub-slot PUCCH repetition configuration for a PUCCH transmission comprising the two or more sub-slot PUCCH repetitions; and
   transmitting two or more sub-slot PUCCH repetitions in accordance with one of the one or more sub-slot PUCCH repetition configurations.

2. The method of claim 1, wherein receiving the dynamic sub-slot PUCCH repetition configuration comprises receiving downlink control information that schedules a Physical Downlink Shared Channel, PDSCH, transmission to the wireless communication device and includes the dynamic sub-slot PUCCH repetition configuration or an indication of the dynamic sub-slot PUCCH repetition configuration.

3. The method of claim 1, wherein transmitting the two or more sub-slot PUCCH repetitions comprises transmitting the two or more sub-slot PUCCH repetitions in accordance with the dynamic sub-slot PUCCH repetition configuration.

4. The method of claim 2, wherein the dynamic sub-slot PUCCH repetition configuration comprises a field in the downlink control information that indicates a number of sub-slot PUCCH repetitions.

5. The method of claim 1, further comprising:
receiving a configuration of a set of possible sub-slot PUCCH repetition configurations;
wherein the dynamic sub-slot PUCCH repetition configuration comprises a value that selects one of the set of possible sub-slot PUCCH repetition configurations as the dynamic sub-slot PUCCH repetition configuration.

6. The method of claim 1, wherein receiving the dynamic sub-slot PUCCH repetition configuration comprises receiving downlink control information that schedules a Physical Downlink Shared Channel, PDSCH, transmission to the wireless communication device and includes a PUCCH resource indicator, PRI, that indicates a particular PUCCH resource, wherein the dynamic sub-slot PUCCH repetition configuration comprises a pre-configured number of repetitions for the particular PUCCH resource.

7. The method of claim 1, wherein the dynamic sub-slot PUCCH repetition configuration comprises a number of repetitions defined in units of a slot.

8. The method of claim 1, wherein the dynamic sub-slot PUCCH repetition configuration comprises a number of repetitions defined in units of a sub-slot.

9. The method of claim 2, wherein the downlink control information further comprises an indication for HARQ ACK timing, and the indication for HARQ ACK timing is applied to a first sub-slot PUCCH repetition from among the two or more sub-slot PUCCH repetitions.

10. The method of claim 9, wherein subsequent sub-slot PUCCH repetitions from among the two or more sub-slot PUCCH repetitions occupy subsequent, consecutive available sub-slots.

11. The method of claim 2, wherein the one or more sub-slot PUCCH repetition configurations comprises two or more HARQ ACK timing values for the two or more sub-slot PUCCH repetitions, respectively.

12. The method of claim 1, wherein each sub-slot PUCCH repetition from among the two or more sub-slot PUCCH repetitions use a same resource allocation in the time domain across two or more consecutive, available sub-slots.

13. The method of claim 1, wherein each sub-slot PUCCH repetition from among the two or more sub-slot PUCCH repetitions is contained within a respective sub-slot.

14. The method of claim 1, wherein at least one sub-slot PUCCH repetition from among the two or more sub-slot PUCCH repetitions spans across a sub-slot boundary.

15. The method of claim 1, wherein at least one sub-slot PUCCH repetition from among the two or more sub-slot PUCCH repetitions spans across a slot boundary.

16. The method of claim 1, wherein a PUCCH resource for one of the two or more sub-slot PUCCH repetitions crosses a sub-slot boundary, and the one of the two or more sub-slot PUCCH repetitions is truncated to be within the sub-slot boundary.

17. The method of claim 1, wherein a PUCCH resource for one of the two or more sub-slot PUCCH repetitions crosses a slot boundary, and the one of the two or more sub-slot PUCCH repetitions is truncated to be within the slot boundary.

18. The method of claim 1, wherein the two or more sub-slot PUCCH repetitions are performed in a back-to-back manner without any symbols gaps between the two or more sub-slot PUCCH repetitions.

19. The method of claim 1, wherein at least one of the two or more sub-slot PUCCH repetitions is extended to reach a sub-slot boundary.

20. The method of claim 1, wherein transmitting the two or more sub-slot PUCCH repetitions comprises transmitting the two or more sub-slot PUCCH repetitions using frequency hopping.

21. The method of claim 20, wherein the frequency hopping is inter-sub-slot frequency hopping, inter-slot frequency hopping, or intra-sub-slot frequency hopping.

22. The method of claim 20, further comprising receiving a frequency hopping configuration that indicates whether or not to perform frequency hopping for sub-slot PUCCH repetitions, wherein transmitting the two or more sub-slot PUCCH repetitions using frequency hopping comprises transmitting the two or more sub-slot PUCCH repetitions using frequency hopping in accordance with the frequency hopping configuration.

23. The method of claim 22, wherein the frequency hopping configuration indicates inter-slot frequency hopping is to be applied for sub-slot PUCCH repetitions.

24. The method of claim 22, wherein the frequency hopping configuration comprises an inter-subslot frequency hopping configuration and an inter-slot frequency hopping configuration, and the wireless communication device ignores the inter-slot frequency hopping configuration responsive to the frequency hopping configuration comprising the inter-subslot frequency hopping configuration.

25. The method of claim 1, wherein transmitting the two or more sub-slot PUCCH repetitions comprises, for a sub-slot PUCCH repetition from among the two or more sub-slot PUCCH repetitions:
determining that there is a collision for the sub-slot PUCCH repetition; and
responsive to determining that there is a collision for the sub-slot PUCCH repetition, taking one or more actions to avoid the collision.

26. The method of claim 25, wherein the one or more actions comprise refraining from transmitting the sub-slot PUCCH repetition.

27. The method of claim 26, wherein the sub-slot PUCCH repetition is counted toward a number of sub-slot PUCCH repetitions transmitted.

28. The method of claim 26, wherein the sub-slot PUCCH repetition is not counted toward a number of sub-slot PUCCH repetitions transmitted.

29. The method of claim 1, wherein transmitting the two or more sub-slot PUCCH repetitions comprises, for a sub-slot PUCCH repetition from among the two or more sub-slot PUCCH repetitions:
determining the sub-slot PUCCH repetition crosses a slot boundary; and
responsive to determining that the sub-slot PUCCH repetition crosses a slot boundary, truncating the sub-slot PUCCH repetition to fit within the slot boundary.

30. The method of claim 1, wherein transmitting the two or more sub-slot PUCCH repetitions comprises, for a sub-slot PUCCH repetition from among the two or more sub-slot PUCCH repetitions:
determining the sub-slot PUCCH repetition crosses a slot boundary; and
responsive to determining that the sub-slot PUCCH repetition crosses a slot boundary, segmenting the sub-slot PUCCH repetition into a first segment that ends at or prior to the slot boundary and a second segment that start at or after the slot boundary.

31. The method of claim 1, wherein:
the one or more sub-slot PUCCH repetition configurations comprise one or more sub-slot PUCCH repetition configurations associated to one or more priority levels or one or more groups of priority levels, respectively;

the method further comprises receiving information that explicitly or implicitly indicates a priority level of the two or more sub-slot PUCCH repetitions; and transmitting the two or more sub-slot PUCCH repetitions comprises transmitting the two or more sub-slot PUCCH repetitions in accordance with one of the one or more sub-slot PUCCH repetition configurations that is associated to the indicated priority level of the two or more sub-slot PUCCH repetitions or associated to a group of priority levels that includes the indicated priority level of the two or more sub-slot PUCCH repetitions.

32. The method of claim 1, wherein the one or more sub-slot PUCCH repetition configurations each comprise information that indicates a number of sub-slot PUCCH repetitions to be transmitted.

33. A wireless communication device for sub-slot Physical Uplink Control Channel, PUCCH, repetitions, the wireless communication device comprising:

one or more transmitters;

one or more receivers; and processing circuitry associated with the one or more transmitters and the one or more receiver, the processing circuitry configured to cause the wireless communication device to:

receive one or more sub-slot PUCCH repetition configurations from a base station, wherein receiving the one or more sub-slot PUCCH repetition configurations comprises receiving a dynamic sub-slot PUCCH repetition configuration for a PUCCH transmission comprising the two or more sub-slot PUCCH repetitions; and transmit two or more sub-slot PUCCH repetitions in accordance with one of the one or more sub-slot PUCCH repetition configurations.

34. A method performed by a base station for sub-slot Physical Uplink Control Channel, PUCCH, repetitions, the method comprising:

providing, to a wireless communication device, one or more sub-slot PUCCH repetition configurations, wherein providing the one or more sub-slot PUCCH repetition configurations comprises providing, to the wireless communication device, a dynamic sub-slot PUCCH repetition configuration for a PUCCH transmission comprising the two or more sub-slot PUCCH repetitions; and receiving, from the wireless communication device, a PUCCH transmission in accordance with one of the one or more sub-slot PUCCH repetition configurations.

35. A base station for sub-slot Physical Uplink Control Channel, PUCCH, repetitions, the base station comprising processing circuitry configured to cause the base station to:

provide, to a wireless communication device, one or more sub-slot PUCCH repetition configurations, wherein providing the one or more sub-slot PUCCH repetition configurations comprises providing, to the wireless communication device, a dynamic sub-slot PUCCH repetition configuration for a PUCCH transmission comprising the two or more sub-slot PUCCH repetitions; and receive, from the wireless communication device, a PUCCH transmission in accordance with one of the one or more sub-slot PUCCH repetition configurations.

\* \* \* \* \*